United States Patent
Yukawa et al.

(10) Patent No.: US 6,946,508 B2
(45) Date of Patent: Sep. 20, 2005

(54) ARTIFICIAL MARBLE AND PRODUCING METHOD THEREOF

(75) Inventors: Nobuhiko Yukawa, Akashi (JP); Masaaki Kitatani, Suita (JP)

(73) Assignees: Nippon Shokubai Co. Ltd., Osaka (JP); N&L Marble Co., Ltd., Tokyo (JP)

( * ) Notice: Subject to any disclaimer, the term of this patent is extended or adjusted under 35 U.S.C. 154(b) by 268 days.

(21) Appl. No.: 10/286,977

(22) Filed: Nov. 4, 2002

(65) Prior Publication Data

US 2003/0096887 A1 May 22, 2003

(30) Foreign Application Priority Data

Nov. 6, 2001 (JP) .................................. 2001-341159
Mar. 4, 2002 (JP) .................................. 2002-058092

(51) Int. Cl.$^7$ .............................................. C08K 3/00
(52) U.S. Cl. ....................................... 524/401; 428/15
(58) Field of Search ............................. 524/401; 428/15

(56) References Cited

U.S. PATENT DOCUMENTS

| | | | |
|---|---|---|---|
| 4,085,246 A | | 4/1978 | Buser et al. |
| 4,871,596 A | * | 10/1989 | Kamiya et al. ............... 428/15 |
| 5,043,377 A | | 8/1991 | Nogi et al. |
| 5,324,757 A | * | 6/1994 | Ohkawa et al. ............. 523/514 |
| 5,364,672 A | | 11/1994 | Schultze-Kraft |
| 5,403,631 A | * | 4/1995 | Sato et al. ..................... 428/15 |
| 5,837,175 A | * | 11/1998 | Mukai et al. ................. 264/73 |
| 6,174,954 B1 | * | 1/2001 | Amekawa ................... 524/533 |
| 6,316,548 B1 | * | 11/2001 | Koyanagi et al. ........... 525/221 |
| 6,323,259 B1 | * | 11/2001 | Ikegami et al. ............. 523/171 |
| 6,387,304 B2 | * | 5/2002 | Mukai et al. ................. 264/73 |
| 6,451,910 B1 | * | 9/2002 | Koyanagi et al. ........... 524/854 |
| 6,511,750 B1 | * | 1/2003 | Yanagase et al. ........... 428/406 |
| 6,527,994 B1 | * | 3/2003 | Hur et al. ..................... 264/73 |
| 6,702,514 B2 | * | 3/2004 | Kaneko et al. ............... 404/32 |

FOREIGN PATENT DOCUMENTS

| | | |
|---|---|---|
| EP | 0814066 A1 | 12/1997 |
| JP | 52-952 | 1/1977 |
| JP | 53-24447 | 7/1978 |
| JP | 01-317139 | 12/1989 |
| JP | 02-102155 | 4/1990 |
| JP | 04-254456 | 9/1992 |
| JP | 8156216 | 6/1996 |
| JP | 9002857 | 1/1997 |
| JP | 9131801 | 5/1997 |
| JP | 9188556 | 7/1997 |
| JP | 11-117219 | 4/1999 |
| JP | 11179853 | 7/1999 |
| JP | 2000-62097 | 2/2000 |
| JP | 2000-198128 | 7/2000 |
| JP | 2000-247710 | 9/2000 |
| JP | 3139685 | 12/2000 |
| JP | 2001-48623 | 2/2001 |

* cited by examiner

Primary Examiner—Kriellion A. Sanders
(74) Attorney, Agent, or Firm—Nixon & Vanderhye P.C.

(57) ABSTRACT

A molding compound in swelling gel phase is prepared by crushing a swelling gel, swelled with a monomer in liquid phase which polymerizes a compound having three-dimensional linking by a radical polymerization reaction, into a predetermined size, and a molding compound (z) is made to adhere to a surface of the molding compound in swelling gel phase so that color difference between a color tone of the molding compound (z) and a color tone of the molding compound in swelling gel phase is not less than 3 in a case where the molding compound (z) is provided on the surface of the molding compound in swelling gel phase, which does not substantially dissolve in the monomer and has a weight change ratio ranging from 0 to +200% in a case where the molding compound in swelling gel phase is completely impregnated with the monomer, so that the molding compound in swelling gel phase and the molding compound (z) are molded under a thermal pressure, and a ratio of the molding compound (z) to a total amount of the molding compound (z) and the molding compound in swelling gel phase is not less than 0.01 weight % and not more than 30 weight %.

49 Claims, 17 Drawing Sheets

ARTIFICIAL MARBLE AND PRODUCING METHOD THEREOF

FIELD OF THE INVENTION

The present invention relates to an artificial marble and a producing method thereof, and specifically to an artificial marble having a design which resembles a natural stone and a producing method thereof.

BACKGROUND OF THE INVENTION

An artificial marble is superior to a natural marble in that it is light and has high workability. The artificial marble is widely used to produce various top boards such as a floor material, a wall material, a table, a kitchen top board, and a wash bowl as a substitute for a natural marble. As an artificial marble, graceful and high-class texture which resembles a natural stone is required, so that how to realize natural-stone-like texture is an important matter.

As a producing method of the artificial marble, the following method (Japanese Publication of Examined Application No. 24447/1978 (Tokukoushou 53-24447) (publication date: Jul. 20, 1978)) is known: for example, natural rock crushed particles and a heat-curable liquid synthetic resin are sufficiently kneaded so as to produce a mass having proper shape and size, and natural rock powdered particles or pigment whose color is different from that of the foregoing natural rock crushed particles are made to adhere to a surface of the mass, and the mass having one or more than one color tones is put into a mold, and the mass is pressed and cured with heat, so that an artificial marble having lineal patterns is obtained.

Further, the following method (Japanese Unexamined Patent Publication No. 102155/1990 (Tokukaihei 2-102155) (Publication date: Apr. 13, 1990) is known: an artificial marble obtained by curing resin components in which filler has been compounded in advance is crushed into particles of predetermined size with a hammer mill or a roll mill, and the particles and resin components are compounded again, so that an artificial marble which resembles a granite is obtained.

In addition, as another method for realizing a design which resembles a natural stone, the following method (Japanese Unexamined Patent Publication No. 952/1977 (Tokukaishou 52-952)(Publication date: Jan. 6, 1997) is known: natural stone particles and resin particles etc. are compounded into a matrix that is constituted of a resin having transparency and filler, so that an artificial marble having a design which resembles a granite is obtained.

However, when a crushed natural stone is used so as to obtain an artificial marble having a design which resembles a natural stone in a method as in Tokukoushou 53-24447, there occurs such a problem that the workability declines. Further, when the crushed natural stone is used, the crushed natural stone does not sufficiently adhere to a resin, so that exfoliation of an interface tends to occur.

Further, in the case where the natural rock crushed particles and a heat-curable liquid synthetic resin are kneaded so as to produce a mass having proper shape and size, and natural rock powdered particles or pigment whose color is different from that of the foregoing natural rock crushed particles are made to adhere to a surface of the mass, and the mass is subjected to press molding, the mass of the kneaded materials is squashed by hot pressing and floats, so that, as shown in FIG. 2, a border line between the masses, that is, the interface of the masses is vague, and a linear shape is not produced, and the interface itself becomes a flow line.

However, it is difficult to produce an artificial marble having a design which resembles a natural stone by using only resin materials, without using the crushed natural stone.

While, like Tokukaihei 2-102155, in the case where crushed hard resin particles obtained by crushing a cured resin are dispersed over resin, which serves as the matrix, so as to be cured, a molding compound made up of only resin materials is used, so that this does not raise problems such as the decline of the workability and the exfoliation of the interface which occur in the case where the crushed natural stone is used. However, when compounding many crushed had resin particles so as to obtain a desired design, porous crushed hard resin particles absorb monomer component in the resin which serves as the matrix, so that viscosity of the molding compound becomes unsteady; or flowability of the molding compound deteriorates and an arrangement of the crushed hard resin particles is imbalanced, so that an unnatural pattern is formed. Thus, it is difficult to produce an artificial marble having a desired pattern. It is general to compound at most about 30 parts crushed hard resin particles with respect to 100 parts matrix.

Further, also the method recited in Tokukaishou 52-952 raises the foregoing problems, so that it is difficult to produce an artificial marble having a desired pattern which resembles a natural stone, and only a granite-like artificial marble having a monotonous pattern can be obtained.

SUMMARY OF THE INVENTION

From the view point of the foregoing problems, the present invention is to provide an artificial marble having a design which extremely resembles a natural stone and a producing method thereof.

The inventors studied the artificial marble and the producing method thereof seriously in order to achieve the foregoing object. As a result, they found that: a molding compound in swelling gel phase with three-dimensional linking structure which has a crushed surface is used, and an interface of a cured material generated by curing the molding compound is emphasized, and this realizes a natural-stone-like expression, so that it is possible to produce an artificial marble having a design which extremely resembles a natural stone without using a crushed natural stone. Also, they found that: if a plane, formed in a gap between surfaces of particles having the crushed surfaces, which is generated by curing the molding compound, is different from the particle in a color tone, and its volume is much smaller than the particle, the interface between the particles is made clear, and this realizes a pattern which resembles a crystal structure, so that it is possible to express a natural-stone-like design. As a result, this led to the creation of the present invention. Further, the inventors found that: like a large number of natural stones, a pattern constituted of a cured material which is different from the particles in a color tone is centralizes at an area surrounded by an apex of the particle having a crushed surface and plural particles adjacent to the foregoing particle, so that it is possible to obtain a natural appearance like a natural stone. Further, the inventors found that: also in a case where the particles, including the crushed surfaces, which are adjacent to each other, have different colors by coloring differently etc., the interface between the particles is made clear, and this realizes a design which resembles a crystal structure, so that it is possible to express a natural-stone-like appearance.

That is, in order to achieve the foregoing object, an artificial marble according to the present invention includes:

grainy resin cured materials (Y); and a matrix, wherein the grainy cured materials (Y) occupy a surface area of the artificial marble at 70 to 99%, and the matrix occupies the surface area of the artificial marble at 30 to 1%, and each of the grainy resin cured materials (Y) adjacent to each other has a joint surface so that the grainy resin cured materials (Y) are substantially interlocked with each other, and an average adjacent ratio of the grainy resin cured materials (Y) is not less than 50%, and an average aspect ratio of the grainy cured materials (Y) is not less than 1.1 and not more than 5.0, and a large particle occupation ratio is not less than 20%.

Further, in order to achieve the foregoing object, the artificial marble according to the present invention includes an aggregate of grainy resin cured materials (Y) having linearly crushed surfaces, which is integrally molded, wherein each of the grainy resin cured materials (Y) adjacent to each other has a joint surface so that the grainy resin cured materials (Y) are substantially interlocked with each other, and a clear streak-like interface constituted of a cured material (Z) is formed between the grainy resin cured materials (Y) adjacent to each other, the cured material (Z) being different from the grainy resin cured materials (Y) in a color tone.

Further, in order to achieve the foregoing object, the artificial marble according to the present invention includes an aggregate of grainy resin cured materials (Y) having linearly crushed surfaces, which is integrally molded, wherein each of the grainy resin cured materials (Y) adjacent to each other has a joint surface so that the grainy resin cured materials (Y) are substantially interlocked with each other, and an area surrounded by an apex of one of the grainy resin cured materials (Y), which is constituted of acutely-angled crushed surfaces, and other grainy resin cured materials (Y) adjacent to the foregoing one of the grainy resin cured materials (Y) is filled with the cured material (Z) which is different from the grainy resin cured materials (Y) in the color tone.

According to the present invention, it is possible to produce an artificial marble having a design in which a borderline between the grainy resin cured materials (Y) is emphasized by its color tone different from the color tone of the particles; the design which extremely resembles a natural stone.

Further, in order to achieve the foregoing object, the artificial marble according to the present invention includes an aggregate of grainy resin cured materials (Y) having linearly crushed surfaces, which is integrally molded, wherein each of the grainy resin cured materials (Y) adjacent to each other has a joint surface so that the grainy resin cured materials (Y) are interlocked with each other, and the grainy resin cured materials (Y) are directly joined with each other, and a streak-like interface constituted between the grainy resin cured materials (Y) adjacent to each other, and the grainy resin cured materials (Y) adjacent to each other are different from each other in a color tone.

Thus, according to the present invention, it is possible to provide a producing method of an artificial marble having a design in which the grainy resin cured materials (Y) adjacent to each other are different from each other in a color tone, so that the interface between the grainy resin cured materials (Y) adjacent to each other is emphasized; the design which extremely resembles a natural stone.

In order to achieve the foregoing object, a producing method of an artificial marble according to the present invention includes the steps of: making a molding compound (z) adhere to a surface of a molding compound in swelling gel phase so that a ratio of the molding compound (z) to a total amount of the molding compound (z) and the molding compound in swelling gel phase is not less than 0.01 weight % and not more than 30 weight %, and molding a molding compound in swelling gel phase and the molding compound (z) under a thermal pressure, wherein: the molding compound in swelling gel phase has been prepared by crushing a swelling gel, swelled with a monomer in liquid phase which polymerizes a compound having three-dimensional linking by a radical polymerization reaction, into a predetermined size, and the molding compound in swelling gel phase substantially does not dissolve in the monomer and has a weight change ratio which ranges from 0 to +200% in a case where the molding compound in swelling gel phase is completely impregnated with the monomer; and the molding compound (z) has been prepared so that color difference between a color tone of a cured material of the molding compound in swelling gel phase and a color tone of a cured material of the molding compound (z) is not less than 3 when the molding compound (z) is applied on the surface of the molding compound in swelling gel phase so as to be cured.

Further, in order to achieve the foregoing object, the producing method of the artificial marble according to the present invention includes the steps of: making a molding compound (z) adhere to a surface of the molding compound in swelling gel phase so that a ratio of the molding compound (z) to a total amount of the molding compound (z) and the molding compound in swelling gel phase is not less than 0.01 weight % and not more than 30 weight %; and molding the molding compound (z) and the molding compound in swelling gel phase under a thermal pressure, wherein: the molding compound in swelling gel phase has been prepared by crushing a swelling gel, generated by swelling a reactive compound with monomer in liquid phase which polymerizes by a radical polymerization reaction, into a predetermined size, and viscosity of the swelling gel measured with a Helipath viscometer is not less than 1,000 Pa·s, and the reactive compound has three-dimensional linking based on a reaction between starting materials (A) and (B), and the starting material (A) has a plurality of reactive substituents selected from a hydroxyl group and a carboxyl group, and the starting material (B) is at least one of (i) a polyfunctional polyisocyanate, (ii) an organic alminium, and (iii) an alkali earth metal oxide, and at least one of the starting materials (A) and (B) contain a compound of three or more functions in one molecule; and the molding compound (z) has been prepared so that color difference between a color tone of a cured material of the molding compound in swelling gel phase and a color tone of a cured material of the molding compound (z) is not less than 3 when the molding compound (z) is applied on the surface of the molding compound in swelling gel phase so as to be cured.

According to the present invention, by using the molding compound in swelling gel phase, it is possible to retain a shape of the crushed surface upon molding it with the thermal pressure. In addition, according to the present invention, the molding compound (z) for coloring, which has been prepared so that the color difference between a color tone of the cured material of the molding compound in swelling gel phase and a color tone of the cured material cured by providing the molding compound (z) on the surface of the molding compound in swelling gel phase is not less than 3, is made to adhere to the surface of the molding compound in swelling gel phase at the foregoing ratio, so that it is possible to emphasize the interface of the resin cured material of the molding compound in swelling gel phase so as to express a natural-stone-like design.

The artificial marble obtained in this manner has the foregoing characteristics (designs) which are inherent to the artificial marble according to the present invention.

Thus, according to the present invention, it is possible to provide the producing method of the artificial marble having the following design: a fine streak is formed around the grainy resin cured material (Y) generated by curing the molding compound in swelling gel phase, and a borderline between the grainy resin cured materials (Y) is emphasized by its color tone different from a color tone of the grainy resin cured material (Y), so that the design extremely resembles a natural marble.

For a fuller understanding of the nature and advantages of the invention, reference should be made to the ensuing detailed description taken in conjunction with the accompanying drawings.

DESCRIPTION OF THE EMBODIMENTS

[Embodiment 1]

Figure 1:
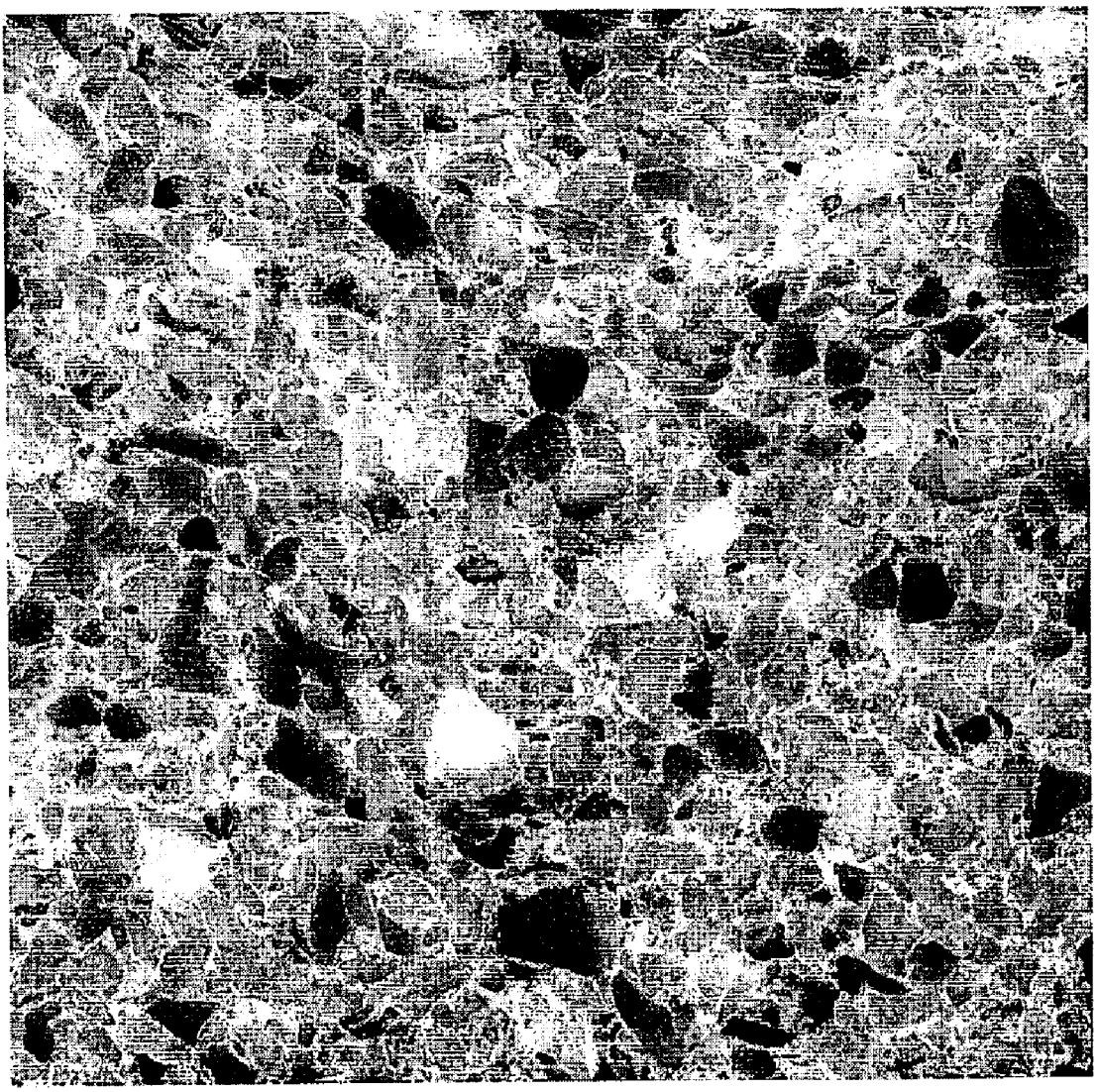
FIG. 1 is a drawing showing a surface pattern of an artificial marble obtained by using an artificial marble producing method according to one embodiment of the present invention.

The following description will discuss an embodiment of the present invention in detail.

A producing method of an artificial marble according to Embodiment 1 of the present invention is as follows. A swelling gel, which is generated by swelling a compound (W) having three-dimensional linking with a monomer in liquid phase which polymerizes by a radical polymerization reaction, is crashed into a predetermined size. This is used as a molding compound in swelling gel phase (hereinbelow referred to as molding compound (y)) having a predetermined degree of swelling (namely, a predetermined weight change ratio in a case where the swelling is performed in the monomer). A molding compound (Z) in powder phase or liquid phase whose color tone is different from that of a grainy resin cured material (Y) (hereinbelow referred to as cured material (Y)), which is generated by curing the molding compound (y) in a swelling gel phase, is made to adhere to a surface of the molding compound (y) so as to cover the whole surface of the molding compound (y) in swelling gel phase, and the monomer is polymerized under a thermal pressure.

The molding compound (y) in swelling gel phase used as a material for an artificial marble in the present invention has a three-dimensional-linking structure, and is a molding compound in swelling gel phase having a crushed surface. The molding compound (y) in swelling gel phase does not substantially dissolve in the monomer, and has a three-dimensional linking structure whose linking density is set so that the weight change ratio varies 0 to +200%, preferably 0 to +100%, in a case where the molding compound (y) is impregnated with excessive (much) monomer.

In the present invention, the weight change ratio is a change ratio of weight in a case where the molding compound (y) in swelling gel phase is impregnated with the sufficiently much (excessive) monomer at 23° C.±2° C. for 24 hours, and an evaluation is given by comparing weight of the molding compound (y) in swelling gel phase that has not been impregnated with weight of the molding compound (y) in swelling gel phase right after filtrating the molding compound (y) in swelling gel phase that has been impregnated with the monomer under the foregoing condition. The filtration has to be quickly performed in a short time so as to avoid evapotranspiration of the monomer, and the filtration is performed to such a minimum extent that the monomer which adheres to the surface of the molding compound in swelling gel phase is removed. A value in a case where the impregnation decreases the weight of the molding compound (y) in swelling gel phase is indicated by minus (−), and a value in a case where the impregnation increases the weight is indicated by plus (+), and a value in a case where the weight is not changed is indicated by 0.

That is, the weight change ratio in the case where the molding compound (y) is completely impregnated with the excessive monomer varies ranges from 0 to +200% seemingly. This indicates that: in the case where the molding compound (y) is impregnated with the monomer under the foregoing condition, the weight of the molding compound (y) ranges from 0 to +200% seemingly with respect to the weight of the molding compound (y) that has not been impregnated. More specifically, in the case where the molding compound (y) is impregnated with the monomer under the foregoing condition, the molding compound can absorb the monomer which is merely twice the weight of the molding compound (y), and the impregnated molding compound (y) is not more than three times the weight of the molding compound that has not been impregnated. The weight change ratio ranges 0 to +100%, and this indicates that: even though the molding compound (y) is impregnated with the monomer, there is no change in the weight seemingly. That is, the molding compound (y) does not absorb more monomer, or even if the molding compound (y) absorbs more monomer, the molding compound (y) can absorb merely the monomer whose weight is the same as the molding compound (y). Then, the impregnated molding compound (y) is not more than twice the weight of the molding compound that has not been impregnated. The phrase "seemingly" is used above, and this indicates that: part of the molding compound (y) is eluted to the monomer, and part of the monomer is absorbed by the molding compound (y), so that these weight changes are offset, so that this is detected as the final weight change.

In a case where the weight change ratio of the molding compound (y) is less than 0% (namely, in a case where the weight change ratio is minus), that is, in a case where an amount of the molding compound (y) eluted by the monomer is larger than an amount of the monomer absorbed by the molding compound (y), the three-dimensional linking (linking density) is not sufficient in the molding compound (y). Thus, in a case where the molding compound is formed under a thermal pressure, it is impossible to sufficiently retain a shape of the crushed surface of a particle which is generated by curing the molding compound. As a result, it is often that patterns of the molding are partially mixed, or only scrolled appearance can be developed vaguely.

On the other hand, also in a case where the weight change ratio is high such as over +200%, the three-dimensional linking (linking density) is not sufficient, and this indicates that the molding compound (y) has a low linking structure which requires much monomer in realizing an equilibrium state. As a result, there are the same problems as in the case where the weight change ratio is minus (−).

While, the molding compound (y), swelled by the monomer whose amount is appropriate, in which linking is performed sufficiently, hardly indicates the change in weight to such an extent that little monomer is absorbed, even when the molding compound (y) is put into much monomer. The weight change ratio ranges from 0 to +200%.

This molding compound (y) in swelling gel phase can be formed so that the shape of the crushed surface is retained while floating suitably when the molding compound (y) is formed with the thermal pressure. Thus, it is possible to produce an artificial marble, which has a linear and sharp crushed surface as shown in FIG. 1, and is made up of grainy cured materials (Y) which is generated by curing the molding compound in swelling gel phase, and has patterns which extremely resemble a natural stone.

Upon obtaining the molding compound (y) in swelling gel phase, the swelling gel used in the present invention is cut, by means of a rotary knife type cutter having a 7 mm screen, into such a size that the swelling gel can pass through the screen. By varying a size of the screen, it is possible to obtain crushed gel particles (cut gel particles) having an arbitrary size. In order to obtain a pattern which resembles a natural stone, it is preferable to use crushed gel particles which have been cut with a 1 mm to 20 mm screen. As an average particle diameter of the crushed gel particle (particle), approximately 0.5 mm to 20 mm is desirable.

The compound (W), used as the molding compound (y) in swelling gel phase, which has a three-dimensional linking is not particularly limited. However, it is required to set the molecular weight and the linking density of the compound (W) in use and the affinity with the monomer in use as required so that the weight change ratio of the crushed swelling gel swelled with the monomer satisfies the foregoing condition. Thus, it is desirable to suitably set the viscosity and the hardness of the molding compound in swelling gel phase which is generated by swelling the compound (W) with the monomer.

Thus, it is desirable that the compound (W) is a reactive compound produced by linking a starting material (A) having a plurality of reactive substituent groups, with a starting material (B) which reacts with the starting material (A) by a reaction other than a radical reaction. This is because it is difficult to suitably set the viscosity and the hardness in the case where the cured resin is obtained by the radical polymerization reaction.

As long as the starting material (A) for the compound (W) has the plurality of reactive substituent groups, the starting material (A) is not particularly limited. Examples of the starting material (A) include a compound and polymers having two or more groups of hydroxyl group, carboxyl group etc. as the reactive substituent group in one molecule. Examples of such monomers are: polyhydric alcohols such as ethylene glycol, diethylene glycol, 1,4-butanediol, neopentyl glycol, trimethylol-propane, and bisphenol A; and polyhydric carboxylic acids such as malonic acid, adipic acid, isophthalic acid, a terephthalic acid. Example of such polymers are: ester polymers such as vinyl ester; unsaturated polyester resins; saturated polyester resins; copolymers of (a) acrylic monomer having carboxylic acid and/or hydroxyl group, such as (meth)acrylic acid, 2-hydroxyethyl (meth) acrylate, 2-ydroxylpropyl (meth)acrylate and (b) acrylic monomer such as methyl (meth)acrylate, ethyl (meth)acrylate, butyl (meth)acrylate; or copolymers of (a) acrylic monomer having the foregoing functional group and (b) aromatic vinyl compound such as styrene and/or α-methyl styrene.

Further, the starting material (B) is not particularly limited as long as it reacts with the reactive substituent group and forms the three-dimensional structure which is swelled by inclusion of liquid in combination with the starting material (A), i.e., as long as it is a so-called thickening compound. Examples of the starting material (B) are polyfunctional polyisocyanate such as tolylene diisocyanate, hydrogenated tolylene diisocyanate, methylene diisocyanate and hexamethylene diisocyanate; organic aluminium such as aluminium isopropoxide; and alkali earth metal oxide such as magnesium oxide.

The combination of the starting material (A) and the starting material (B) is determined so that at least one of the starting material (A) and the starting material (B) contains a compound of three or more functions.

The compound (W), that is, the reactive compound can be obtained by reacting the starting materials (A) and (B) as required, under the presence of monomer (X), which polymerizes by a radical polymerization reaction, in a known manner. The starting materials (A) and (B) are suitably combined depending on, for example, how a molding which is obtained by molding the molding compound (y) and the molding compound (z) according to the present invention is used, and on properties required in the molding, and properties required upon molding. That is, the formulating composition and the amounts of the starting materials (A) and (B) used in the molding compound (y) are not particularly limited.

In addition, the reaction conditions of the starting materials (A) and (B) are not particularly limited. Therefore, any compounds which are linked by a reaction other than a radical polymerization reaction can be used as the starting materials (A) and (B). Note that, the starting materials (A) and (B) may have functional groups that react by radical reaction, for example, a double bond.

When linking the starting materials (A) and (B) by reaction, for example, it is also possible to use reaction catalyst such as dibutyltin dilaurate together, but it is not particularly limited. It is possible to obtain a reaction compound having three-dimensional-linking bond (covalent bond/ionic bond) as the compound (W) by linking the starting materials (A) and (B).

Further, radical polymerization catalyst for starting radical polymerization upon molding the molding compound (y) can be added to the reactive compound. Examples of the radical polymerization catalyst are organic peroxides, such as benzoyl peroxide, cyclohexanone peroxide, methyl ethyl ketone peroxide, t-butyl peroxybenzoate, t-butyl peroxypivalate, bis(4-t-butylcyclohexyl)peroxydicarbonate, diisoprpyl peroxidicarbonate,1,1-bis(t-butylperoxy)-3,3,5-trimethyl cyclohexane, and 2,4,4-trimethylpentyl peroxy-neodecanoate. However, the radical polymerization catalyst is not particularly limited to those compounds. It is preferable to use the radical polymerization catalyst in an amount ranging from 0.2 weight parts to 2.0 weight parts with respect to 100 weight parts the compound (W) and the monomer (X) in total.

It is possible to add to the reactive compound the following materials. Various additives and thermoplastic resins such as polystyrene, polyvinyl acetate, and saturated polyester. Examples of the additives are: fillers such as magnesium hydroxide, calcium carbonate, and aluminium hydroxide; coloring agent; cure accelerator; surface treatment agent such as silane coupling agent and phosphate compound; internal mold release agent such as wax; reinforcing agents such as glass fibers, various synthetic fibers such as polyester and aramide, and carbon fibers, all of these fibers having a length of about 1 mm to 6 mm; and metal oxides. In addition, it is also possible to add additives such as ultraviolet abosorbing agent and flame retarder to the reaction compound as required.

For example, it is possible to change a color tone and transparency of the molding compound (y) in swelling gel phase by adding the coloring agent to the reactive compound.

For example, by adding the filler to the reactive compound, it is possible to give opacity, translucency, and flame resistance to the molding compound (y) in swelling gel phase. In addition to this, shrinkage which occurs upon curing the molding compound (y) in swelling gel phase can be restricted, and the surface hardness of the obtained moldings can be improved, and crack can be prevented.

It is preferable that the molding compound (y) includes metal hydroxide at 10 to 80 weight %. That is, it is preferable that the grainy cured material (Y) in the obtained molding includes metal hydroxide at 10 to 80 weight %. Thus, it is possible to obtain texture like a natural stone and to give the flame resistance to the molding.

In this manner, by adding the various additives to the reactive compound, it is possible to obtain a molding, having a predetermined property, on which desired patterns are generated. Compounds such as the reactive catalyst, the radical polymerization catalyst, and various additives are added to the reactive compound as follows. Compounds such as various additives are added to the starting material (A) and/or the starting material (B) and/or the monomer (X), all of which have not reacted. After the resultant is agitated and dispersed, the starting materials (A) and (B) are linked to each other by reaction under the presence of the monomer (X) as required.

The coloring agent is not particularly limited, but it is possible to use organic or inorganic pigment in general use with respect to the starting materials (A) and (B). However, it is preferable to use coloring agent which does not have a bad influence on the reaction with the starting materials (A) and (B). Further, color of the coloring agent is not limited, but it is preferable to adjust colors depending on the desired patterns.

Further, in a case where more complicate and more delicate patterns are generated, it is preferable to use several kinds of coloring agents whose coloring tones are different from each other. In a case where the coloring agent is added to the reactive compound, the coloring agent may be uniformly mixed with the reactive compound. Alternately, two or more kinds of compounds (W), having not been cured, in which the coloring agents whose coloring tones are different have been mixed in advance, and the monomer (X) may be unevenly mixed; that is, mixture of the compounds (A) and (B) may be unevenly mixed with the monomer (X) so as to produce a so-called streaking, or scrolled patterns.

An amount (use amount) of the various additives and the synthetic resin added to the reactive compound is not limited, but in the case where the coloring agent is added to the reactive compound, a use amount of the coloring agent is not more than 30 weight parts with respect to 100 weight parts, a total of the reactive compound (compound (W)) and the monomer (monomer (X)), and a preferred amount is not more than 20 weight parts. Even though the use amount of the coloring agent is more than 30 weight parts, little difference can be seen in the appearance, and little effect can be obtained. In addition, a curing reaction of the molding compound (y) becomes slow, so that this arrangement is not preferable. If the use amount of the coloring agent is not more than 20 weight parts, little influence is given to performance, such as curing property. Thus, this is preferable.

Further, in the case where the filler is added to the reactive compound, it is preferable that a use amount of the filler is not more than 300 weight parts with respect to 100 weight parts, a total of the reactive compound (compound (W)) and the monomer (monomer (X)), and a preferred amount is not more than 200 weight parts. In the case where the use amount of the filler is more than 300 weight parts, fluidity of the molding compound (y) deteriorates, so that it becomes difficult to perform the molding. Further, the strength is lowered, so that the flexibility tends to be lowered. In the case where the amount of the used filler is not more than 200 weight parts, it is easy to perform the crushing (cutting) operation and the strength is high, so that a preferred operation can be performed.

The amount of the coloring agent and the filler that are added to the reactive compound is adjusted, so that it is possible to vary the color tone and transparency of the molding compound (y) in swelling gel phase as required. As shown in FIG. 1, it is possible to obtain an artificial marble whose appearance has deepness (depth).

The molding compound (y) in swelling gel phase according to the present invention can be obtained by crushing a swelling gel, that is generated by swelling the compound (W) having three-dimensional linking with monomer in liquid phase that polymerizes by a radical polymerization reaction, into a predetermined size.

The molding compound (y) in swelling gel phase can be obtained as follows. For example, after mixing the starting materials (A), (B), and the monomer (X) in liquid phase that polymerizes by a radical polymerization reaction, the starting materials (A) and (B) are linked to each other by a reaction other than the radical polymerization reaction so as to generate a reactive compound swelled with the monomer (X). Then, the reaction compound is crashed into a predetermined size.

In this case, after mixing the starting materials (A), (B), and the monomer (X), the starting materials (A) and (B) are linked with each other by a reaction other than the radical polymerization reaction, so that it is possible to obtain the reactive compound swelled by the monomer (X) which polymerizes by the radical polymerization reaction, that is, it is possible to obtain a linking macromolecule gel having a three-dimensional linking structure (three-dimensional mesh structure) with the monomer (X) in liquid phase therein.

That is, when the starting materials (A) and (B) are three-dimensionally linked to each other, the monomer (X) exists. Thus, the monomer (X) exists in the reactive compound having the three-dimensional linking structure. Further, since the monomer (X) reacts by the radical polymerization reaction, the monomer (X) does not make any contribution in reaction of the three-dimensional linking. Therefore, the reactive compound is swelled by the monomer (X) in liquid phase.

Note that, also in a case where the starting materials (A) and (B) have a radical polymerization reactive substituent group, the monomer (X) remains unreacted since the radical polymerization reaction is not performed when the starting materials (A) and (B) are three-dimensionally linked to each other. Thus, the reactive compound made up of the starting materials (A) and (B) is swelled with the monomer (X) in liquid phase.

The monomer (X) used in the present invention is not particularly limited as long as the monomer is liquid that polymerizes by the radical polymerization reaction. As the monomer (X), various monomers which have been used conventionally are given. Examples of the monomers are: aromatic vinyl compounds, such as styrene and α-methyl styrene; acrylic acid compounds such as (meth)acrylic acid, methyl (meth)acrylate, isobutyl (meth)acrylate, ethylene glycol di(meth)acrylate and trimethylolpropane tri(meth)acrylate. Among these compounds, more preferred compounds are polyfunctional(meth)acrylates such as ethylene glycol di(meth)acrylate and trimethylolpropane tri(meth)acrylate because it is possible to improve the reactivity, the heat resistance, and the solvent resistance if monofunctional monomer is used together.

A use amount of the monomer (X) with respect to the reactive compound, i.e., a use amount of the monomer (X) with respect to the compound (W) is not particularly limited, but it is preferable that the amount is adjusted to such an extent that the compound (W) can be sufficiently swelled. Further, a method for mixing the starting materials (A), (B), and the monomer (X) is not particularly limited.

Further, the thermoplastic resin can be added to the reactive compound. The thermoplastic resin is mixed, so that shrinkage which occurs upon curing the molding compound (y) in swelling gel phase is restricted. And the surface smoothness of the obtained molding can be improved, and crack can be prevented.

Note that, in a case where the thermoplastic resin is used, it is preferable that the thermoplastic resin is mixed as far as the thermoplastic resin is not more than 100 weight parts with respect to 100 weight parts, a total of the reactive compound (compound (W)) and the monomer (monomer (X)). To mix more than 100 weight parts of the thermoplastic resin is not preferred, because there is a possibility that the transparency, the heat resistance, and the water resistance may deteriorate.

In the present invention, a method for crushing a swelling gel which has been obtained by swelling the compound (W) with monomer in liquid phase which polymerizes by the radical polymerization reaction, for example, with the monomer (X) is not particularly limited. It is possible to crush the swelling gel easily in a predetermined method, for example, the reactive compound which has been swelled with the monomer (X) is cut by a cutter etc. For example, the swelling gel may be agitated or cut with a medium or low-speed agitator or a kneader. Alternately, the swelling gel may be agitated or cut in a container having a rotary cutter. Thus, it is possible to crush the swelling gel into a predetermined size. The molding compound (y) in swelling gel phase is a gel, and has suitable softness, so that a shape of a crushed surface is linear and sharp.

It is preferable that: the swelling gel which has been obtained by swelling the compound (W) with monomer in liquid phase which polymerizes by the radical polymerization reaction can be easily crushed into the foregoing size, and has the foregoing weight change ratio, and has the viscosity and the hardness to retain the shape of the crushed surface of the molding compound (y) in swelling gel phase upon generating the swelling gel. Although depending on a composition of the monomer (X), it is preferable that the viscosity is not less than 1000 Pa·s when measured with a Helipath viscometer, and the hardness is preferably not more than 100 HDD when measured with a durometer hardness tester of type D.

Since the swelling gel has suitable softness, it can be crushed with relatively small force. Moreover, since the swelling gel has suitable viscosity, particles with diameters smaller than the desired particle diameter can hardly be generated by crushing. Thus, it is possible to improve the yield (i.e., a so-called crushing yield) when producing the particles.

Further, only the molding compound (y) in swelling gel phase is cured by using a plate-like metallic mold so that its thickness is 1 cm. In this manner, a cured material (Y) is generated. The molding compound (z) whose thickness is 0.5 mm is placed on an uncured, uncrushed molding compound (y) that has been cut so as to fill the metallic mold with its thickness being 1 cm. The molding compound (z) is integrally cured in the metallic mold so as to generate a cured material (Z). There is a difference between the cured material (Y) and the cured material (Z) in terms of a color tone. As long as the color difference is not less than 3, the molding compound (z) used as a material for an artificial marble in the present invention is not particularly limited. The color difference can be measured in accordance with JISK7105 by means of Color Measuring System (made by Nihon Densyoku Co., Ltd.) etc.

In the case where the color difference is less than 3, it is hard to see a pattern produced by the molding compound (z), that is, a boundary surface (interface) which is formed in a gap between surfaces of particles having crushed surfaces obtained by curing the molding compound (y) in swelling gel phase. As a result, preferred design cannot be obtained.

The larger the color difference becomes, the more preferable it becomes in producing a clear pattern. The color difference is preferably not less than 5, and more preferably not less than 7. Particularly, the molding compound (z) which finally brings about the color difference of not less than 10 is used. The larger the color difference becomes, the clearer the interface of each cured material (Y) becomes when curing the molding compound (y) in swelling gel phase. A use amount of the molding compound (z) can be restricted to minimum, so that it is possible to restrict the deterioration in the physical strength and the heat cycle resistance of the obtained artificial marble. Thus, the larger color difference is more preferred, and its upper limit is not particularly limited. However, it is natural that the color tone which can be realized has limit. At the present stage, it is generally considered that the maximum 150 in the color difference can be realized. Thus, the color difference can be considered to range from not less than 3 to not more than 150. However, the larger color difference is more preferred. If it is possible to achieve over 150 in the color difference, the color difference may be set to be more than 150.

According to the present invention, the powder-like or liquid-like molding compound (Z) for coloring, which brings about not less than 3 in the color difference, is made to adhere to (is dusted over) a surface of the molding compound (y) in swelling gel phase so as to cover the surface, so that it is possible to emphasize the interface of the cured material (Y) generated by curing the molding compound (y) in swelling gel phase. As a result, it is possible to develop a pattern like a natural stone.

The color tone of the cured material (Z) generated by providing the molding compound (z) on a surface of the molding compound (y) in swelling gel phase is a color tone when the molding compound (z) is finally cured. More concretely, for example, in a case where the molding compound (z) is in powder phase, the monomer (X) kept in the molding compound (y) in swelling gel phase oozes out from the molding compound (y) in swelling gel phase so as to cure the molding compound (z). A color tone at this time is the foregoing color tone. Therefore, the color tone of the cured material (Z) is not necessarily identical with the color tone of the molding compound (z) in powder phase, for example, in a case where they are different in terms of the transparency.

Thus, when selecting the molding compound (z), it is preferable to prepare a color tone sample of the molding compound (Z) in advance according to a combination of the molding compound (y) in swelling gel phase and the molding compound (z).

The color tone sample of the molding compound (Z) is prepared, for example, by the following method. First, in a case where a color tone sample of 30 cm×30 cm is prepared so as to fill a metallic mold, it is required to use an uncured, uncrushed molding compound (y) in swelling gel phase which has been cut in a size of 29 cm×29 cm and has 1 cm thickness when it is cured. A molding compound (z) whose amount is set so that its thickness is 0.5 mm upon curing is provided on or sprinkled over a surface of the molding compound (y) in swelling gel phase. Thereafter, they are heated and pressed in the metallic mold of 30 cm×30 cm so as to prepare the color tone sample of the molding compound (Z).

The molding compound (z) may be transparent or translucent as long as the color difference is not less than 3. For example, acrylic resin and unsaturated polyester resin are used as the molding compound (z), and single resin or a little filler and coloring agent etc. are used so as to make the molding compound (z) transparent or translucent. Thereafter, the colored molding compound (y) in swelling gel phase is coated so as to be cured, so that it is possible to obtain a colored design of the crushed compound in which there are sections divided by transparent or translucent streaks.

It is preferable to mix the molding compound (z) so that the color difference between the color tone of the cured material (Z) of the molding compound (z) and the color tone of the cured material (Y) of the molding compound (y) adjacent to the cured material (Z) is not less than 3 in the obtained artificial marble. It is possible to obtain the color difference between the color tone of the cured material (Y) and the color tone of the cured material (Z) adjacent to the cured material (Y) in the obtained artificial marble on the basis of an image obtained by digitizing the surface design of the formed artificial marble in accordance with a method described later in Examples.

Comparation is performed with respect to the following two cases: a case where the color difference between the color tone of the cured material (Y) of only the molding compound (y) and the color tone of the cured material (Z) of the molding compound (z) cured on the molding compound (y) is calculated in accordance with the method described later in Examples; and a case where the color difference is calculated on the basis of an image obtained by digitizing the surface design of the formed artificial marble. The comparation shows that the color difference calculated in accordance with the latter method tends to be smaller than the color difference calculated in accordance with the former method. The cause of this may be as follows: a thickness of the molding compound (z), which forms the interface, partially becomes thin, so that the color tone of the molding compound (y) appears to transmit. This may cause the color difference between them to be small. Thus, if the color difference calculated in accordance with the latter method is not less than 3, it can be presumed that the color difference calculated in accordance with the former method is also not less than 3.

As the molding compound (z), compound in powder phase is preferably used. It is preferable to use the molding compound (z) in powder phase because the molding compound (z) in powder phase can uniformly coat a surface of the molding compound (y) with ease and it is possible to obtain beautiful streaks.

The molding compound (z) in powder phase is not particularly limited as long as the foregoing color difference is achieved. However, examples of the molding compound (z) are: fillers such as calcium carbonate, aluminium hydroxide, magnesium hydroxide, and talc; inorganic pigments such as titanium oxide, zinc oxide, and iron oxide; natural stone powder such as crushed calcite, silicate powder, and mica powder; coloring resin powder, crushed plastic such as a cut coloring film; powder having unique color tone such as organic color powder, organic pigment powder; crushed artificial marble; opaque coloring agent in liquid phase such as mixture of the foregoing powder and radical polymerization monomer such as trimethylolpropane tri(meth)acrylate, or radical polymerization resin such as unsaturated polyester resin, and acrylic resin. Like this, as long as the material adheres to a surface of the molding compound (y) in swelling gel phase and produces the color difference on a surface (interface) of the molding compound (y) in swelling gel phase, the material is not particularly limited and can be used as the molding compound (z).

Note that, as the coloring resin powder, it is possible to use powder which has been generated by crushing the cured material (Y) of the molding compound (y) whose color is different from that of the cured material (Y) of the molding compound (y). The crushing operation is performed by means of a roll crushing machine or a hummer mill etc. That is, the molding compound (z) may be the cured material (Y) of the molding compound (y) whose color tone is different from that of particles generated by curing the molding compound (y) (that is, the color difference is not less than 3). In this case, it is possible to reduce the deterioration in the strength of the obtained molding.

In a case where the molding compound (z) in powder phase as the molding compound (z), it is also possible to disperse the molding compound (z) in powder phase over liquid (dispersion medium). For example, organic pigment, inorganic pigment, and colors are dispersed over non-reactive dispersion medium. The resultant can be used as the molding compound (z).

The dispersion medium over which the molding compound (z) in powder phase is dispersed is not particularly limited, as long as the material evaporates to some extent in a process in which the molding compound (y) and the molding compound (z) are mixed or in a molding process thereafter, or as long as the material has little influence on curing even though the material remains in the molding compound. Examples of the material are: solvent such as aceton, methyl ethyl ketone, and xylene, or methylcellosolve, and dimethylphthalate.

In the case where the molding compound (z) in powder phase is dispersed over the non-reactive dispersion medium in this manner, it is preferable that the viscosity of the liquid which contains the molding compound (z) in powder phase is not more than 30 Pa·s. An amount of the molding compound (z) is set so that the desired design can be realized, and an amount of the dispersion medium is set so that the viscosity of the liquid which contains the molding compound (z) is not more than 30 Pa·s as described above. In a case where the viscosity of the liquid which contains the molding compound (z) is more than 30 Pa·s, it takes a long time to make the molding compound (Z) adhere to a surface of the molding compound (y). This is inefficient, so that this is not preferred.

In the case where the foregoing solvent is used as the dispersion medium, it is possible to increase the solvent so as to lower the viscosity of the liquid which contains the molding compound (z), thus improving an operating condition. However, it is preferable that a total amount of the solvent is not more than 20 weight % with respect to the molding compound (y). It is not preferable that the total amount of the solvent is more than 20 weight % with respect to the molding compound (y), because curing property of the molding compound (y) to which the molding compound (z) has adhered is deteriorated, and this deteriorates molding property and material property largely.

Further, as the dispersion medium, it is possible to use the following reactive dispersant: monofunctional radical polymerization monomer such as methyl methacrylate and stylene; polyfunctional radical polymerization monomer such as ethylene glycol di(meth)acrylate, trimethylolpropane tri(meth)acrylate, and divinylbenzene; radical polymerization resin such as unsaturated polyester resin, vinylester resin, and acrylic resin. In this case, it is preferable that a total amount of the dispersion medium is not more than 30 weight % with respect to the molding compound (y). It is not preferable that the total amount of the dispersion medium is more than 30 weight % with respect to the molding compound (y), because molding property of the molding compound (y) to which the molding compound (z) has adhered is deteriorated, and this deteriorates material property largely.

In a case where the molding compound (z) in powder phase is non-reactive material, the molding compound (z) in powder phase is dispersed over the monofunctional radical polymerization monomer, or the polyfunctional radical polymerization monomer, or the radical polymerization resin, so that it is possible to restrict the deterioration in material property of the molding compound (y), to which the molding compound (z) has adhered, to minimum.

It is preferable to arrange the molding compound (z) so that its average particle diameter is not more than 100 $\mu$m, preferably not more than 70 $\mu$m, because the strength is little deteriorated.

In the present invention, it is preferable that a use amount of the molding compound (z) ranges from not less than 0.01 weight % to not more than 30 weight % with respect to a total amount of the molding compound (z) and the molding compound (y) in swelling gel phase so that it is possible to cover a surface of the molding compound (y) in swelling gel phase efficiently depending on a surface area of the molding compound (y) in swelling gel phase. It is more preferable that the upper limit is 5 weight %, and not more than 1 weight % is still more preferable.

If the use amount of the molding compound (z) is less than 0.01 weight %, it is impossible to sufficiently cover the surface of the molding compound (y) in swelling gel phase, so that it is impossible to mark out the interface of the cured material (Y) of the molding compound (y) in swelling gel phase. Thus, there is a possibility that an artificial marble having the desired design cannot be obtained. Meanwhile, if the use amount of the molding compound (z) is more than 30 weight %, the following defect may be brought about. In a case where the molding compound (z) is a molding compound (z) in powder phase that has no hardenability, an amount of the monomer which oozes to the molding compound (z) in powder phase is too little to cure the molding compound (z) sufficiently, so that the strength of the obtained artificial marble may decline. Further, if the amount of the used molding compound (z) is too much, it is impossible to mark out the interface of the molding compound (Y), so that the desired design which resembles a natural marble may not be obtained.

Particularly, in the case where the use amount of the molding compound (z) is not more than 5 weight %, a fine streak can be obtained, so that it is possible to obtain the design which extremely resembles a natural stone. Further, it is more preferable that the use amount of the molding compound (z) is not more than 1 weight %, because the physical strength and the heat cycle resistance less decline.

A method for making the molding compound (z) adhere to a surface of the molding compound (y) in swelling gel phase is not particularly limited, as long as it is possible to mix the molding compound (y) in swelling gel phase with the molding compound (z) in powder phase at a predetermined ratio, or it is possible to mix the molding compound (y) in swelling gel phase with the liquid in which the molding compound (z) in powder phase has been dispersed over the dispersion medium at a predetermined ratio. Examples of the methods are: a method wherein the molding compound (y) in swelling gel phase is put into a mixer such as a concrete mixer and a kneader, and the molding compound (z) or the liquid in which the molding compound (z) has been dispersed over the dispersion medium is put into the mixer while agitating the molding compound (y), so that the molding compound (z) is made to adhere to a surface of the molding compound (y) in swelling gel phase; a method wherein the molding compound (y) in swelling gel phase and the molding compound (z) or the liquid in which the molding compound (z) has been dispersed over the dispersion medium are put into a container such as an open drum at the same time so as to rotate the drum sideways with a drum rotating machine; and a method wherein a fixed amount of the molding compound (z) or the liquid which contains the molding compound (z) is sprinkled or sprayed while transmitting the molding compound (y) in swelling gel phase constantly from a hopper.

Further, the mixing condition is not particularly limited as long as the molding compound (y) in swelling gel phase is mixed with the molding compound (z) with such strength that the molding compound (y) in swelling gel phase is not crushed. It is preferable that the molding compound (z) is made to uniformly adhere to a surface of the molding compound (y) in swelling gel phase.

In the present invention, it is preferable that the molding compound (z) is powder, and the molding compound (z) is made to adhere directly to the surface of the molding compound (y), because it is possible to mark out the surface of the molding compound (y) so as to develop the design which resembles a natural stone.

Further, the method wherein the liquid in which the molding compound (z) has been dispersed over the dispersion medium is made to adhere to the surface of the molding compound (y) is preferred. The reason for this is as follows: it is easy to make the molding compound (z) adhere to the whole surface of the molding compound (y), so that non-uniformity of the appearance is reduced. As a result, it is possible to develop the high-quality design.

In addition, it is preferable that the liquid in which the molding compound (z) has been dispersed over the dispersion medium which radically polymerizes (that is, monomer which polymerizes by the radical polymerization reaction, such as the monomer (X)) is made to adhere to a surface of the molding compound (y), because the material property such as the strength and the heat resistance of the molding are little deteriorated.

According to the present invention, the molding compound (y) in swelling gel phase to which the molding compound (z) for coloring has adhered is molded under a thermal pressure, so that it is possible to obtain an artificial marble as a molding. In the present invention, the following method is preferably used: the molding compound (y) with the molding compound (z) on its surface is spread in a metallic mold so as to mold the resultant into a plate-like molding under the thermal pressure. As a method for filling the metallic mold with the molding compound (y), a preferred method is as follows: the mentioned molding compound (y) in swelling gel phase, that is, the molding compound (y) in swelling gel phase, which has the molding compound (z) for coloring on its surface, is charged over a metallic mold surface in a dispersing manner. In a case where a plate having a uniformed thickness is molded, a preferred method is as follows: a cavity of the metallic mold is used as a bottom side mold, and the molding compound (y) that has been divided into some portions are dispersively charged so that the molding compound (y) is charged throughout the whole cavity in a substantially uniformed manner. A surface of the charged molding compound (y) is leveled by means of a proper, stick-like jig so that the height of the resultant is constant on the basis of the metallic mold surface.

A molding condition of the molding compound (y) in swelling gel phase is not particularly limited as long as the molding condition is set according to a composition etc. of the molding compound (y) in swelling gel phase. Although a preferred molding temperature varies depending on the composition of the molding compound (y) in swelling gel phase, the molding temperature (metallic mold temperature) is generally set within a range of not less than 90° C., not more than 170° C., preferably not less than 100° C., not more than 160° C. It is not preferable that the molding temperature is less than 90° C., because it takes too much time to cure the molding compound (y) or the storage stability of the molding compound (y) cured by a curable catalyst which sufficiently cures the molding compound (y) at this temperature may be deteriorated. On the other hand, it is not preferable either that the molding temperature is more than 160° C., because the molding time is hardly reduced and there occur problems such as crack and discoloring of the molding.

Although a preferred molding pressure varies depending on the viscosity, flowability, and the curing time of the molding compound, it is generally preferable that the molding pressure is set not less than 20 kg/cm$^2$, and not more than 100 kg/cm$^2$. It is not preferable that the molding pressure is less than 20 kg/cm$^2$, because cracks and pinholes tend to remain in the molding. On the other hand, it is not preferable either that the molding pressure is more than 100 kg/cm$^2$, because the lifetime of the metallic mold may be shortened.

Note that, in order to facilitate the release of the molding, it is also possible to mold the molding compound as follows: a resin film such as polyethylene terephthalate is spread on the metallic mold surface in advance, and the molding compound (y) having the molding compound (z) on its surface is charged on the resin film so as to mold the molding.

The molding obtained in this manner can be used as an artificial marble without processing the molding further, but it is preferable to perform the following process: the molding compound (y) in swelling gel phase, that is, the molding compound (y) in swelling gel phase having the molding compound (z) in powder phase on its surface is spread in the metallic mold so as to be molded in a plate-like molding under the thermal pressure. Thereafter, a surface of the resultant is ground.

The artificial marble obtained in this manner is an aggregate of the grainy cured materials (Y) obtained by curing the molding compounds (y) in swelling gel phase, and the molding compound (z) which has adhered to a surface of the molding compound in swelling gel phase brings about a fine streak (streaked pattern) on an outer surface of each grainy cured material (Y), so that the artificial marble has the design in which a borderline between the grainy cured materials (Y) having a crushed surface is emphasized.

The molding compound (y) in swelling gel phase according to the present invention is arranged as follows: A shape of its crushed surface is deformed to such minimum extent that spaces which had existed before molding is filled, but the shape is substantially kept as it is. Moreover, since the molding compound (y) in swelling gel phase has the weight change ratio, the viscosity, and the hardness described above, molding compounds (y) in swelling gel phase adjacent to each other are pushed to each other due to the thermal pressure in molding, so that adjacent molding compounds (y) in swelling gel phase are joined to each other so that they are substantially interlocked to each other via a streaked pattern portion constituted of the cured material (Z) which has been generated by curing the molding compound (z). That is, the artificial marble according to the present invention is arranged as follows: In a case where one of the adjacent molding compounds (y) in swelling gel phase has a recessed portion on its outer surface, a single molding compound (y) in swelling gel phase or plural molding compounds in swelling gel phase bring about a protruding portion which substantially fits into the recessed portion on an outer surface of the other molding compound (y) in swelling gel phase adjacent to the foregoing molding compound (y).

Thus, according to the present embodiment, it is possible to obtain the artificial marble characterized in that: an average adjacent ratio, calculated by a method described later in Examples, which indicates an average ratio of adjacent portions where the one grainy cured material (Y) generated by curing the molding compound (y) in swelling gel phase is adjacent to the other grainy cured material (Y)

via a gap (streaked pattern portion) is not less than 50%, not more than 100%, preferably not less than 60%. The gap is narrower by 20% than an average diameter obtained by averaging the substantially longest length and the substantially shortest length of the grainy cured material (Y).

According to the present embodiment, in a case where the weight change ratio of the molding compound (y) in swelling gel phase ranges from +10 to +200%, or a value measured with a Helipath viscometer ranges from 1,000 Pa·s to 150,000 Pa·s, or the hardness measured with a durometer hardness tester of type D is not more than HDD 75, a streaked pattern, constituted of the cured material (Z), whose color tone is different from the grainy cured material (Y) adjacent to the cured material (Z) is formed between the grainy cured materials (Y) adjacent to each other.

Note that, in a case where the molding compound (y) which is harder than the foregoing molding compound (y) is used, that is, in a case where the weight change ratio of the molding compound (y) in swelling gel phase ranges from 0 to less than +10%, or a value measured with the a Helipath viscometer is more than 150,000 Pa·s, or the hardness is more than HDD 75 and not more than HDD 100, it is possible to obtain an artificial marble characterized in that: the molding compound (z) is pushed out from a gap between the molding compounds (y) in swelling gel phase adjacent to each other due to a pressure in molding, and the pushed-out molding compound (z) flows into an area (space) surrounded by an apex of the molding compound (y) in swelling gel phase which has produced by crushing the swelling gel and plural molding compounds (y) adjacent to the foregoing molding compound (y) in swelling gel phase, so that a flat portion of the particle, that is, a side portion of the grainy cured material (Y) which is a linear crushed surface brought about by crushing the swelling gel has a joint surface whose shape allows the cured materials (y) adjacent to each other to be interlocked with each other, and the design is characterized in that an area surrounded by a top portion of the grainy cured material (Y), that is, an apex of the grainy cured material (Y) and plural grainy cured materials (Y) adjacent to the foregoing grainy cured material (Y) is filled with the cured material (Z) of the molding compound (z).

Note that, in a case where a crushed natural stone or crushed hard resin particles obtained by crushing a cured resin are used, the crushed natural stone and the crushed hard resin particles retain their shapes, so that particles adjacent to each other do not have such shapes that enable them to be interlocked with each other in the obtained artificial marble, and the particles are in point contact with each other via a matrix etc. Thus, in the case where the crushed natural stone or the crushed hard resin particles are used, it is impossible to obtain the artificial marble having the foregoing average adjacent ratio.

Further, since the molding compound (y) in swelling gel phase according to the present invention retains a shape of its crushed surface substantially as it is when subjected to the thermal pressure, it is possible to obtain an artificial marble having the design which is an aggregate of grainy resin cured materials (Y) having linear crushed surfaces. The artificial marble according to the present invention is characterized in that: an average aspect ratio of the grainy resin cured material (Y) which is measured by a method described later in Examples is not less than 1.1, not more than 5.0, and a large particle occupation ratio which indicates a ratio at which particles whose longest side is not less than 1 mm and occupy the surface area is not less than 20%, not more than 100%.

In the artificial marble according to the present invention, a ratio at which the grainy resin cured materials (Y) occupy the surface area of the artificial marble ranges from 70 to 99%, and a ratio at which the streaked-pattern portion, constituted of the cured material (Z) generated by curing the molding compound (z), which is a matrix portion other than the grainy resin cured material (Y) occupies the surface area of the artificial marble ranges from 30 to 1%.

Note that, in the present invention, a portion other than the particles is referred to as a matrix or a matrix portion. Thus, in the present embodiment, a portion other than the grainy resin cured material (Y) is referred to as a matrix or a matrix portion. The artificial marble according to the present embodiment is arranged so that: the molding compound (z) that has been made to adhere to a surface of the molding compound (y) in swelling gel phase becomes the cured material (Z) of the molding compound (z) so as to constitute a finely streaked pattern (streaked pattern) as a matrix between the grainy resin cured materials (Y) adjacent to each other. Thus, in the artificial marble according to the present embodiment, a finely streaked pattern (streaked pattern) portion, constituted of the cured material (Z) of the molding compound (z), that corresponds to a matrix portion of a conventional artificial marble, is referred to as a streaked pattern portion in particular.

Moreover, in the artificial marble according to the present invention, voids and spaces are not found, and a ratio of the spaces with respect to a total volume is not more than 1% in the obtained artificial marble.

Figure 2:
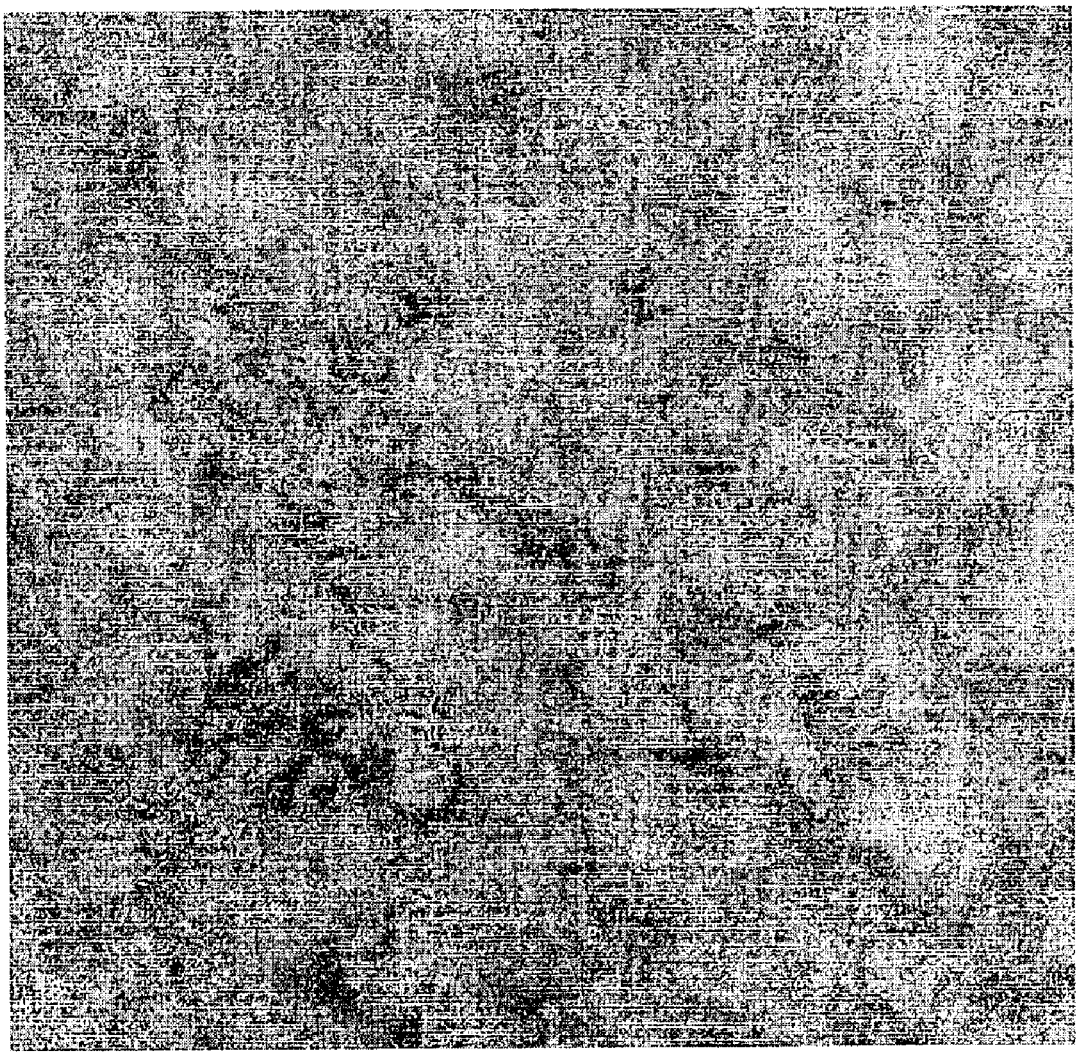
FIG. 2 is a drawing showing a surface pattern of a conventional artificial marble.

Note that, in a case where a mass of such a kneaded compounds that used in a conventional producing method of an artificial marble is used instead of the molding compound (y) in swelling gel phase, since the mass of the kneaded compounds flows after being crushed, a borderline between the masses, that is, the interface becomes vague and a sharp shape is not formed as shown in FIG. 2. As a result, the interface becomes a flowing pattern, so that it is impossible to obtain the artificial marble having design which is an aggregate of the grainy resin cured materials (Y) having linear crushed surfaces.

As described above, the artificial marble obtained by the producing method according to the present embodiment is characterized in that: an interface which is constituted of the molding compound (z) in powder phase formed in a gap between surfaces of particles having crushed surfaces, that is, a gap between surfaces of the respective molding compounds (y) has a color tone different from that of the foregoing particles, and its volume is smaller than that of the foregoing particles. Thus, as shown in FIG. 1, unlike a conventional artificial marbles, the artificial marble of the present invention is an aggregate of particles having a sharp interface, and the borderline between the particles is emphasized, thus producing a design which extremely resembles a crystal structure of a natural stone.

That is, the artificial marble according to the present invention is an aggregate of grainy resin cured materials (Y) having linearly crushed surfaces, which is integrally molded, and each of grainy resin cured materials (Y) adjacent to each other have a joint surface whose shape allows the grainy resin cured materials (Y) adjacent to each other to be substantially interlocked with each other, and the artificial marble has a design in which a streaked, clear interface constituted of a cured material (Z) whose color tone is different from that of the grainy resin cured material (Y) adjacent to the foregoing cured material (Z) is formed between the grainy resin cured materials (Y) adjacent to each other. In the artificial marble, the grainy resin cured material (Y) and the cured material (Z) form a clear interface without being mixed with each other.

As described above, the artificial marble includes: grainy resin cured materials (Y); and a matrix (streaked-pattern portion) other than the grainy resin cured materials (Y). More concretely, the grainy resin cured materials (Y) occupy a surface area of the artificial marble at 70 to 99%, and the matrix occupies the surface area of the artificial marble at 30 to 1%, and each of grainy resin cured materials (Y) adjacent to each other has a joint surface whose shape allows the grainy resin cured materials (Y) adjacent to each other to be substantially interlocked with each other, and an average adjacent ratio of the grainy resin cured materials (Y) is not less than 50%, and an average aspect ratio of the grainy resin cured materials (Y) is not less than 1.1, not more than 5.0, and a large particle occupation ratio is not less than 20%.

Moreover, according to the present embodiment, it is possible to obtain the artificial marble having such design without using a crushed natural stone. Thus, the present invention does not raise problems such as deterioration of workability and exfoliation of the interface which are brought about in the case where the crushed natural stone is used, and it is possible to provide the artificial marble having a design which extremely resembles a natural stone.

Further, in the present embodiment, the above-mentioned swelling gel for producing a pattern, that is, the molding compound (y) in swelling gel phase is used, so that color of the particle appears to vary depending on a size and a thickness of the swelling gel, and depth of the interface.

The molding compound (y) in swelling gel phase of a single color may be used, or the molding compounds (y) in swelling gel phase of plural colors which have been variously colored (plural types of the molding compounds (y) in swelling gel phase) may be used. Note that, the artificial marble shown in FIG. 1 is produced by using the molding compounds (y) in swelling gel phase of the plural colors which have been variously colored as a material for the artificial marble. Further, as the molding compound (y) in swelling gel phase, not only the molding compound (y) in swelling gel phase which has been colored but also a transparent molding compound (y) in swelling gel phase is used, so that it is possible to obtain an artificial marble which resembles a natural stone. Note that, for example, filler and coloring agent are not added to the reactive compound, so that the transparent molding compound (y) in swelling gel phase can be obtained easily.

Further, in a case where the desired pattern is more complicate, for example, the starting material (A) and the starting material (B) are linked to each other by a reaction other than a radical polymerization reaction under the presence of the monomer (X) so as to generate a reactive compound (first reactive formation mixture) swelled by the monomer (X). The first reactive formation mixture is crushed into a desired grain size, and the resultant is mixed with starting materials (C), (D), and monomer (E) which polymerizes by a radical polymerization reaction so as to link the starting materials (C) to (D) by a reaction other than the radical polymerization reaction. Then, by repeating the formation process of the reactive compound (second reactive formation mixture) swelled by the monomer (E) one or more times, it is possible to obtain an artificial marble in which a particle contains other particles.

As described above, since the first reactive formation mixture is sufficiently swelled (weight change ratio ranges from 0 to +200%), even though the first reactive formation mixture is added to the monomer (E), the first reactive formation mixture does not absorb much monomer (E). Thus, the viscosity of the mixture of the starting materials (C), (D), and the monomer (E) is retained at a desired value, so that the workability in adding/mixing is improved. In addition, the dispersibility of the first reactive formation mixture is improved, so that an unbalanced pattern does not occur. Further, in the case where the first reactive formation mixture is added to the monomer (E), the first reactive formation mixture has the viscosity and the hardness to such an extent that a shape of the crushed surface can be retained, so that it is possible to develop the desired pattern. This causes the second reactive formation mixture to have the predetermined pattern which derives from the first reactive formation mixture. Thus, by using the second reactive formation mixture obtained in this manner as the molding compound (y) in swelling gel phase, that is, a swelling gel swelled with the monomer in liquid phase which polymerizes the compound (W) having three-dimensional linking, it is possible to obtain an artificial marble which is highly three-dimensional, and has more complicate and more beautiful patterns.

The first reactive formation mixture can be obtained by a reaction between the starting materials (A) and (B) which is brought about by a known method. Further, the second reactive formation mixture can be obtained by a reaction between the starting materials (C) and (D) which is brought about by a known method. It is preferable to combine the starting materials (A), (B), (C), and (D) suitably so as to obtain a required property depending on use of the obtained artificial marble. That is, the composition of the starting materials (A) and (B) constituting the first reactive formation mixture, and a use amount of the starting materials (A) and (B); and the composition of the starting materials (C) and (D) constituting the first reactive formation mixture, and a use amount of the starting materials (C) and (D) are not particularly limited. Further, a reaction condition etc. of the starting materials (A) and (B), and a reaction condition etc. of the starting materials (C) and (D) are not particularly limited.

A compound similar to the starting material (A) can be used as the starting material (C). Note that, the starting materials (A) and (C) may be identical, or may be different from each other. Moreover, in a case where a generation process in which another second reactive formation mixture is generated from the foregoing second reactive formation mixture is repeated several times, the starting materials (C) used in the respective processes may be identical or different from each other.

Further, a compound similar to the starting material (B) can be used as the starting material (D). Note that, the starting materials (B) and (C) may be identical, or may be different from each other. Moreover, in a case where the generation process in which another second reactive formation mixture is generated from the foregoing second reactive formation mixture is repeated several times, the starting materials (D) used in the respective processes may be identical or different from each other.

Thus, also in a case where an artificial marble using the second reactive formation mixture is produced, it is possible to use any compound, that links to another compound by a reaction other than the radical polymerization reaction, as the starting materials (A), (B), (C), and (D). Note that, the starting materials (A), (B), (C), and (D) may have a functional group which reacts radically, for example, a double bond.

Further, when pressing the molding compound (y) in swelling gel phase, the generation may be performed as follows: when filling a metallic mold with the molding compound (y) in swelling gel phase which has the molding compound (z) on its surface, the molding compounds (y) in swelling gel phase which have different color tones are arranged in advance, for example, a molding compound (y) in swelling gel phase having a white color tone and a molding compound (y) in swelling gel phase having a black color tone are arranged in a streaked manner, that is, the molding compounds (y) are spread in the whole metallic mold so as to be molded in a plate-like shape so that the desired pattern can be obtained.

Thus, it is possible to obtain an artificial marble having a pattern which appears different in a case where the pattern is seen widely; for example, the pattern appears to be a large flow pattern.

Note that, in the case of using the molding compounds (y) in swelling gel phase which are colored variously as the molding compounds (y) in swelling gel phase, the molding compound (z) is selected so that color difference between a color tone of the cured material (Y) generated by curing only the molding compound (y) in swelling gel phase that is most often used and a color tone of the cured material (Z) of the molding compound (z) provided on the molding compound (y) integrally is not less than 3. It is preferable to select the molding compound (z) so that color difference between a color tone of the selected molding compound (z) and a color tone of the molding compound (y) of not less than 50 weight % with respect to all the molding compound (y) used as a material for an artificial marble is not less than 3, and it is the most preferable to select the molding compound (z) so that the color difference between the molding compound (z) and a cured material generated by curing all the molding compound (y) used as a material for the artificial marble is not less than 3.

Further, in the present invention, various types of molding compounds (z) whose color tones are different from each other are prepared in advance, and these molding compounds (z) are made to adhere to a surface of the molding compound (y) at the same time as the molding compound (z), and a mixing operation required in adhering is performed so that the respective colors are not completely mixed with each other. The completion of the mixing operation allows the streaked pattern of the formed interface, which is variously colored and has partially color-mixed portions, to be obtained.

Further, plural types of molding compounds (y) coated with the molding compounds (z) having different color tones are prepared, they are unevenly mixed with each other in molding, so that it is possible to obtain the streaked pattern of the formed interface which is variously colored and has partially color-mixed portions.

Further, when the molding compound (z) is made to adhere to the surface of the molding compound (y), in a case where the viscosity of the molding compound (y) is much higher than the viscosity of the molding compound (z) in liquid phase, concretely, the weight change ratio of the molding compound (y) in swelling gel phase ranges from 0 to +100%, or a value measured with a Helipath viscometer is not less than 10,000 Pa·s, or the hardness measured with a durometer hardness tester of type D is not less than HDD 15 and not more than HDD 100, and the viscosity of the molding compound (z) is not more than 10 Pa·s, the molding compound (z) flows into a space formed by the molding compounds (y), so that it becomes easier to form a characteristic design. That is, the design is characterized in that: the space tends to be enlarged due to an aggregation of plural particles, and the streaked pattern is large on the vicinity of an apex of the particle, and the particles are centralized at a flat portion of the particle which tends to be deformed due to a pressure in molding. In the case where a surface of the design is ground, it is possible to obtain a design in which the streaked patterns exist close together at a top portion of the particle, and the particles exist close together at a side portion of the particle so as to constitute the fine streaked pattern. Natural stones having such design are seen so often, so that the foregoing characteristic is an important factor in realizing a natural appearance.

It is possible to evaluate the centralization of the streaked patterns brought about at the top portion of the particle, in accordance with an average-side-vicinity-centralization ratio described later in Examples. Then, it is preferable that the value is not more than 50%, because it is possible to obtain a design whose pattern resembles a natural stone.

As described above, according to the present embodiment, when the molding compound (z) is made to adhere to the surface of the molding compound (y), in a case where the viscosity of the molding compound (y) is much higher than the viscosity of the molding compound (z) in liquid phase, it is possible to obtain an artificial marble which includes an aggregate of grainy resin cured materials (Y) having linearly crushed surfaces, which is integrally molded, wherein each of the grainy resin cured materials (Y) has a joint surface whose shape allows the grainy resin cured materials (Y) adjacent to each other to be substantially interlocked with each other, and a design in which an area surrounded by an apex of one of the grainy resin cured materials (Y) and plural grainy resin cured materials (Y) adjacent to the foregoing one of the grainy resin cured materials (Y) is filled with the cured material (Z) generated by curing the molding compound (z).

The artificial marble obtained by a method according to the present embodiment is superior to a natural stone in its light weight and the workability (cutting, grinding, adhesion, and the like), and has graceful and high-class texture like a natural stone. The artificial marble is preferably used for various top boards such as a floor material, a wall material, a table, a kitchen worktop, and a wash bowl.

[Embodiment 2]

The following description will discuss another embodiment of the present invention in detail.

In the present embodiment, the same reference numerals are given to the same components as components described in Embodiment 1, and descriptions thereof are omitted.

An artificial marble according to the present embodiment includes an aggregate of grainy resin cured materials (Y) having linearly crushed surfaces, which is integrally molded, wherein each of the grainy resin cured materials (Y) has a joint surface whose shape allows the grainy resin cured materials (Y) to be substantially interlocked with each other, and the grainy resin cured materials (Y) is directly joined to each other, and the grainy resin cured materials (Y) are different from each other in a color tone due to different coloring, and a clear interface is formed between the grainy resin cured materials (Y) adjacent to each other.

It is possible to obtain the artificial marble according to the present embodiment by a method different from the method in Embodiment 1 in that: the molding compounds (y) in swelling gel phase of different colors (plural types) which have been colored differently are used as a material for the artificial marble, and the molding compounds (y) in swelling gel phase are molded under a thermal pressure without making the molding compound (z) adhere to the surface of the molding compound (y).

As described in Embodiment 1, for example the coloring agent and the filler are added to the compound (W), for example, a reactive compound generated by linking the starting materials (A) and (B) three-dimensionally so as to adjust an amount of the added coloring agent and filler, so that it is possible to suitably change the color tone and the transparency of the molding compound (y) used as a material for the artificial marble. Further, not only the colored molding compound (y) in swelling gel phase but also a transparent molding compound (y) in swelling gel phase are used as the foregoing molding compound (y) in swelling gel, so that it is possible to obtain an artificial marble which is more similar to a natural stone. Note that, for example the filler and the coloring agent are not added to the reactive compound, so that it becomes easy to obtain the transparent molding compound (y) in swelling gel.

Further, also in the present embodiment, in the case where the desired pattern is still more complicate, for example, the starting material (A) and the starting material (B) are linked to each other by a reaction other than a radical polymerization reaction under the presence of the monomer (X) so as to generate a reactive compound (first reactive formation mixture) swelled with the monomer (X). The first reactive formation mixture is crushed into a desired grain size, and the resultant is mixed with starting materials (C), (D), and monomer (E) which polymerizes by the radical polymerization reaction so as to link the starting materials (C) and (D) by a reaction other than the radical polymerization reaction. Then, by repeating the generation process of a reactive compound (second reactive formation mixture) swelled with the monomer (E) one or more times, it is possible to obtain an artificial marble in which a particle contains other particles.

Also in the present embodiment, as described in Embodiment 1, since the first reactive formation mixture is sufficiently swelled (weight change ratio ranges from 0 to +200%), even though the first reactive formation mixture is added to the monomer (E), the first reactive formation mixture does not absorb much monomer (E). Thus, the viscosity of the mixture of the starting materials (C), (D), and the monomer (E) is retained at a desired value, so that the workability in adding/mixing is improved. In addition, the dispersibility of the first reactive formation mixture is improved, so that an unbalanced pattern does not occur. Further, in the case where the first reactive formation mixture is added to the monomer (E), the first reactive formation mixture has the viscosity and the hardness to such an extent that a shape of the crushed surface can be retained, so that it is possible to develop the desired pattern. This causes the second reactive formation mixture to have the predetermined pattern which derives from the first reactive formation mixture. Thus, by using the second reactive formation mixture obtained in this manner as the molding compound (y) in swelling gel phase, that is, a swelling gel swelled with the monomer in liquid phase which polymerizes the compound (W) having three-dimensional linking, it is possible to obtain an artificial marble which is highly three-dimensional, and has more complicate and more beautiful patterns.

Further, when generating the molding compound (y) in swelling gel phase, the generation may be performed as follows: when filling a metallic mold with the molding compound (y) in swelling gel phase, the molding compounds (y) in swelling gel phase which have different color tones are arranged in advance, for example, a molding compound (y) in swelling gel phase having a white color tone and a molding compound (y) in swelling gel phase having a black color tone are arranged in a streaked manner, that is, the molding compounds (y) are spread in the whole metallic mold so as to be molded in a plate-like shape so that the desired pattern can be obtained. Thus, it is possible to obtain an artificial marble having a pattern which appears different in a case where the pattern is seen widely; for example, the pattern appears to be a large flow pattern.

As to the molding compound (y), the present embodiment is different from Embodiment 1 in that: the molding compounds (y) in swelling gel phase that are different in color tone are used instead of the molding compound (z), and only the molding compound (y) in swelling gel phase is cured by using a plate-like metallic mold so that its thickness is 1 cm. In this manner, a cured material (Y) is generated. The molding compound (y), that is, the second layer whose thickness is 0.5 mm is placed on an uncured, uncrushed molding compound (y), the first layer, that has been cut so as to fill the metallic mold with its thickness being 1 cm. The molding compound (y) is integrally cured in the metallic mold so as to generate a cured material (Y). There is a difference between the cured material (Y) in the case where only the molding compound (y) in swelling gel phase is cured and the cured material (Y) of the second layer molding compound (y) in terms of color tone. It is preferable to combine the foregoing molding compounds so that the color difference is not less than 3 in accordance with JIS K7105. It is preferable that the foregoing color difference is not less than 5, more preferably, not less than 7, and still more preferably not less than 10.

Further, it is more preferable to combine the molding compounds (y) with each other so that the color difference between the cured materials (Y) of the molding compounds (y) which are adjacent to each other is not less than 3. In the obtained artificial marble, it is possible to calculate the color difference between the cured materials (Y) of the molding compounds (y) which are adjacent to each other, as in the color difference between the cured material (Y) of the molding compound (y) which are adjacent to each other and the cured material (Z) of the cured material (z), in accordance with an image generated by digitizing a surface design of the artificial marble.

According to the present embodiment, by selecting the combination of the molding compounds (y) which are used so that the grainy resin cured materials (Y) adjacent to each other are different from each other in a color tone, it is possible to make the interface between the cured materials (Y) of the molding compound (y) in swelling gel phase clear, so that a pattern which resembles a natural stone can be expressed.

As described in Embodiment 1, the artificial marble according to the present embodiment can be obtained as a molding by molding the molding compound (y) in swelling gel phase used as a material for the artificial marble preferably under the thermal pressure in accordance with press molding. That is, in the present embodiment, the molding method of the molding compound (y) in swelling gel phase is preferably as follows: the plural molding compounds (y) in swelling gel phase, which are different from each other in color due to coloring, are mixed, and the obtained mixture is spread in the metallic mold so as to be subjected to the press molding with its shape like a plate. A method for filling the metallic mold with the molding compound (y) in swelling gel phase is preferably as follows: the molding compound (y) in swelling gel phase is dispersed over a metallic mold surface so as to charge the molding compound (y) in swelling gel phase. In a case where the molding compound (y) is molded so that its thickness is uniformed, as described in Embodiment 1, a cavity of the metallic mold is used as the bottom side mold, and the molding compound (y) that has been divided into some portions are dispersively charged so that the molding compound (y) is charged in the whole cavity in a substantially uniformed manner. A surface of the charged molding compound (y) is leveled by means of a proper, stick-like jig so that the height of the resultant is constant on the basis of the metallic mold surface.

A molding condition of the molding compound (y) in swelling gel phase is not particularly limited as long as the molding condition is set according to a composition etc. of the molding compound (y) in swelling gel phase. Although a preferred molding temperature varies depending on the composition of the molding compound (y) in swelling gel phase, the molding temperature (metallic mold temperature) is generally set, as described in Embodiment 1, to range from not less than 90° C., not more than 170° C., preferably not less than 100° C., not more than 160° C. Although a preferred molding pressure varies depending on the viscosity, the flowability, and the curing time of the molding compound, it is generally preferable that the molding pressure is set to be not less than 20 kg/cm$^2$, and not more than 100 kg/cm$^2$.

Note that, in order to facilitate the release of the molding, it is also possible to mold the molding compound as follows: a resin film such as polyethylene terephthalate is spread on the metallic mold surface in advance, and the molding compound (y) is charged on the resin film so as to mold the molding.

The molding obtained in this manner can be used as an artificial marble without processing the molding further, but it is preferable to perform the following process: the molding compound (y) in swelling gel phase is spread in the metallic mold so as to be molded in a plate-like shape under the thermal pressure. Thereafter, a surface of the resultant is ground.

The artificial marble according to the present invention which is obtained in this manner includes an aggregate of grainy cured materials (Y), and has a design which extremely resembles a crystal structure of a natural stone in which grainy cured materials (Y) are adjacent to each other and different from each other in color tone, and a borderline between the cured materials (Y) with crushed surfaces is clearly distinguished. Moreover, according to the present embodiment, it is possible to obtain the artificial marble having such design without using a crushed natural stone.

The molding compound (y) in swelling gel phase according to the present embodiment is arranged as follows: a shape of its crushed surface is deformed to such a minimum extent that the spaces which had existed before molding are filled, but the shape is substantially kept as it is. Moreover, since the molding compound (y) in swelling gel phase has the weight change ratio, the viscosity, and the hardness described above, the molding compounds (y) in swelling gel phase adjacent to each other are pushed to each other due to the thermal pressure in molding, and the molding compounds (y) in swelling gel phase deform so that a gap in the molding compounds (y) in swelling gel phase is filled, so that the molding compounds (y) in swelling gel phase are interlocked with each other. Thus, also in the artificial marble obtained in the present embodiment, the grainy resin cured materials (Y) constitute an interface where the grainy resin cured materials (Y) are successively in contact with each other so that they are interlocked with each other.

According to the present invention, there are not problems such as the deterioration in the workability and the exfoliation of the interface brought about in the case where a crushed natural stone is used. In addition, it is possible to provide an artificial marble having a design which extremely resembles a natural stone.

Further, since also the molding compound (y) in swelling gel phase according to the present embodiment substantially retains its shape of the crushed surface in heat pressing, the artificial marble has a design which is constituted of an aggregate of the grainy resin cured materials (Y) having linearly crushed surfaces, which is integrally molded, and an average aspect ratio of the grainy resin cured material (Y) is not less than 1.1, not more than 5.0, and a large particle occupation ratio which indicates a ratio at which particles whose longest side is not less than 1 mm occupy the surface area is not less than 20%, not more than 100%.

Further, also in the artificial marble according to the present embodiment, voids and spaces are not found, and a ratio of the total spaces with respect to a total volume is not more than 1% in the obtained artificial marble.

The artificial marble according to the present embodiment, as in the artificial marble described in Embodiment 1, is superior to a natural marble in the workability and its light weight, and has graceful and high-class texture like a natural stone. The artificial marble is preferably used for various top boards such as a floor material, a wall material, a table, a kitchen worktop, and a wash bowl.

Hereinbelow, the present invention is more detailed in accordance with Examples and Comparative Examples, but the present invention is not limited by the Examples and the Comparative Examples. Note that, "part" described in the Examples and the Comparative Examples refers to "weight part".

In accordance with the following method, measurement was performed as to ratios etc. obtained in the following Examples. That is, the measurement was performed as to (a) a ratio at which the particle portion and the streaked pattern portion (matrix portion) occupy a surface area of the artificial marble, (b) an average adjacent ratio, (c) an average aspect ratio, (d) a large particle occupation ratio, (e) an average-side-vicinity-streak-centralization ratio, (f) a ratio at which spaces occupy the artificial marble, (g) viscosity/ hardness of the reactive molding, and (h) color difference. (Ratio at which the particle portion and the streaked pattern portion (matrix portion) occupy the surface area of the artificial marble)

A uniformed portion of 5 cm×5 cm in a surface design of the obtained molding was read out with a scanner, and the read-out portion was gotten as an image file. The obtained image file was taken in an image processing soft (Photoshop by Adobe), and the following processes were performed.

(1) First, a color tone was converted so as to emphasize difference in the color tone between the particle portion constituted of the grainy resin cured materials (Y) and the streaked pattern portion. At this time, an area selection was performed as to the particle portion or the streaked pattern portion of the obtained image by the image processing soft, and the color tone was converted into a single color, so as to perform the next binarizing operation easily.

Figure 6:
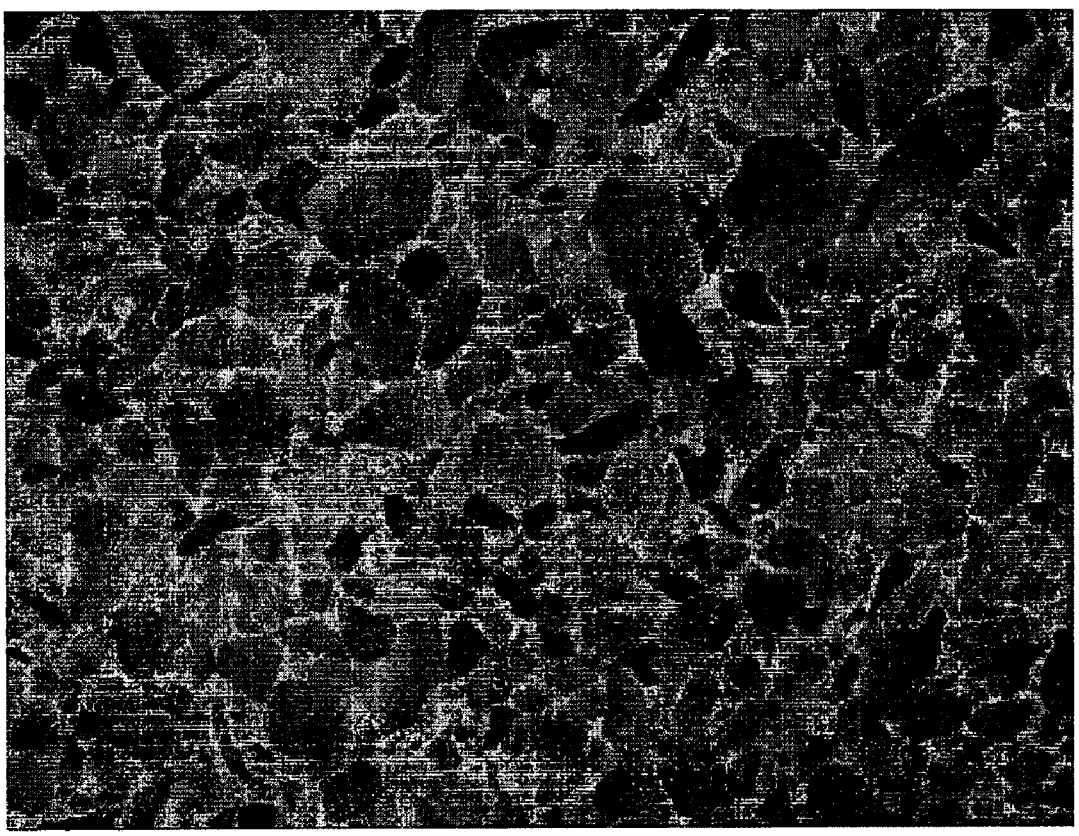
FIG. 6 is a drawing showing a surface pattern of an artificial marble obtained in Example 2.
Figure 7:
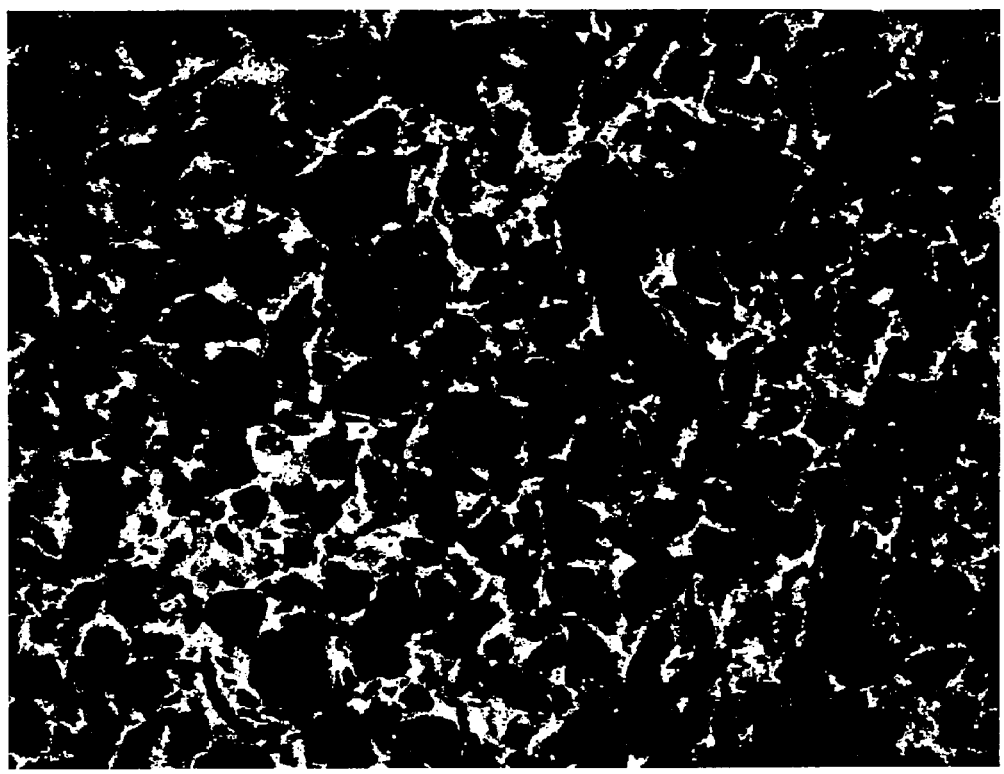
FIG. 7 is a drawing which shows a binarized image obtained by image-processing the drawing shown in FIG. 6.

(2) Thereafter, the image data was binarized so that the image data was divided between the particle portion and the streaked-pattern portion. This operation caused the streaked-pattern portion to be converted into black, and the particle portion to be converted into white (vice versa). At this time, a threshold value was set so that the image data was divided substantially at a borderline between the particle portion and the streaked pattern portion. For your information, FIG. 6 is a drawing showing the surface pattern of the artificial marble obtained in Example 2. FIG. 7 is a drawing showing the binarized image obtained by performing an image process with respect to FIG. 6 so as to calculate the ratio at which the particle portion and the streaked-pattern portion occupy the surface area of the artificial marble.

(3) Next, histogram of the image was checked, and a ratio of a white area to a total surface area and a ratio of a black area to the total surface area were calculated, so that a ratio of a particle portion area to a surface of the obtained molding and a ratio of a streaked pattern portion area to the surface of the obtained molding were calculated. Note that, a ratio of the matrix portion area to the total surface area of the obtained molding can be calculated in the same manner as in the ratio of the streaked pattern portion area to the total surface area of the obtained molding.

(Average Adjacent Ratio)

The image file, which has been obtained by reading a uniformed portion of 5 cm×5 cm in a surface design of the obtained molding with a scanner, was used, and the average adjacent ratio was calculated in accordance with the following method.

(1) An image of the portion of 5 cm×5 cm that has been read out with the scanner was printed out, and a single particle (grainy resin cured material), which was substantially largest, was selected from the printed image.

(2) The substantially longest portion of the selected particle was measured, and this longest portion was regarded as a length. Further, the substantially shortest portion of the selected particle was measured, and this shortest portion was regarded as a breadth.

(3) An average value of the length and the breadth was calculated, and the calculated value was used as an average diameter.

(4) A portion (portion where the streaked pattern is formed) in which distance between the selected particle and a particle adjacent to the foregoing particle was narrower than the 20% average diameter was sought, and an outer surface of the particle in the narrower portion was colored with a color which was not used in the image (hereinbelow, red was used). The foregoing operation was performed with respect to all the particles, which were adjacent to the selected particle in the whole outer surface of the selected particle, one by one.

(5) Length of the colored portion and length of the whole outer surface of the selected particle were calculated in accordance with the printed image, and a ratio of the colored portion with respect to the whole outer surface was calculated, so that a ratio (adjacent ratio) of an area in which the selected particle neighbors upon the adjacent particle was calculated.

(6) The adjacent ratio of a second-largest particle was calculated in accordance with the printed image, and the calculation was repeated with respect to smaller particles in order, so as to obtain data as to 10 particles in total. (7) The obtained data as to the 10 particles were averaged, and the resultant was the average adjacent ratio.

(Average Aspect Ratio)

The image file, which has been obtained by reading a uniformed portion of 5 cm×5 cm in a surface design of the obtained molding with a scanner, was used, and the average aspect ratio was calculated in accordance with the following method.

(1) First, an image of the portion of 5 cm×5 cm that has been read out with the scanner was printed out, and a single particle, which was substantially largest, was selected from the printed image.

(2) The substantially longest portion of the selected particle was measured, and this longest portion was regarded as a length. Further, the substantially shortest portion of the selected particle was measured, and this shortest portion was regarded as a breadth.

(3) The length/breadth was calculated as the average aspect ratio.

(4) The average aspect ratio of a second-largest particle was calculated in accordance with the printed image, and the calculation was repeated with respect to smaller particles in order, so as to obtain data as to 10 particles in total.

(5) The obtained data as to the 10 particles were averaged, and the resultant was the average aspect ratio.

(Large Particle Occupation Ratio)

The image file, which has been obtained by reading a uniformed portion of 5 cm×5 cm in a surface design of the obtained molding with a scanner, was used, and the large particle occupation ratio was calculated in accordance with the following method.

(1) First, on a picture, an arbitrary image of 3 cm×3 cm was selected from the image of 5 cm×5 cm which has been read out with a scanner.

(2) On the picture, all particles whose longest side was not less than 1 mm were selected, and the selected particles were colored with a color which was not used on the picture (hereinbelow, red was used). At this time, in a case where color tones of the particles were different from the color tones of the streaked pattern and the particles which existed on the vicinity of the foregoing particles, an area of the particle portion was selected in accordance with color tone difference. Thereafter, the selected area was colored red. While, in a case where a borderline (outer surface) of the particles was vague, the interface between the particle portion and the streaked-pattern portion was manually selected, and the area of the particle portion was selected. Thereafter, the selected area was colored red.

(3) Areas other than the colored area were selected, and the areas were colored with a color other than the foregoing red (hereinbelow, blue is used).

(4) A ratio of an area of the red-colored portion and an area of the blue-colored portion to a total colored area was calculated in accordance with histogram, and a ratio of the red-colored portion area with respect to all the colored portion area was calculated. The resultant was regarded as the large particle occupation ratio.

(Average-side-vicinity-streak-centralization Rate)

The image file, which has been obtained by reading a uniformed portion of 5 cm×5 cm in a surface design of the obtained molding with a scanner, was used, and the average-side-vicinity-streak-centralization ratio was calculated in accordance with the following method.

(1) First, the obtained image file was taken in an image processing soft (Photoshop by Adobe). Then, a color tone was converted so as to emphasize difference in the color tone between the particle portion and the streaked-pattern portion which are constituted of the grainy resin cured materials (Y). At this time, an area selection was performed as to the particle portion or the streaked-pattern portion of the obtained image by the image processing soft, and the color tone was converted into a single color, so as to perform the next binarizing operation easily.

(2) Thereafter, the image data was binarized so that the image data was divided between the particle portion and the streaked-pattern portion. This operation caused the streaked-pattern portion to be converted into black, and the particle portion to be converted into white (or vice versa). At this time, a threshold value was set so that the image data was divided substantially at a borderline between the particle portion and the streaked-pattern portion.

(3) The binarized image obtained in this manner was printed out, a single particle which was substantially largest was selected from the binarized image that had been printed out.

(4) Approximately 2 to 6 portions having an acute angle were picked up from the circumference of the selected particle, and the selected portions were regarded as apices.
(5) As many sides as the apices selected in (4), which were constituted of linearly crushed surfaces, were selected from a portion near a straight line in the circumference of the selected particle.
(6) The substantially longest portion of the selected particle was measured, and this longest portion was regarded as length. Further, the substantially shortest portion of the selected particle was measured, and this shortest portion was regarded as breadth. An average value of the length and the breadth was calculated as an average diameter.
(7) A circle having a diameter which was identical with the 20% average diameter was drown by regarding one of the apices of the selected particle as a center, and an area of the streaked-pattern portion contained in the circle was calculated.
(8) The foregoing operation (7) was performed with respect to all the apices that had been selected one by one, and a total of the resultants was calculated as an apex-vicinity-streak area.
(9) While, a circle containing one side of the selected particle as its diameter which was identical with the calculated average diameter 20% was drawn, and an area of the streaked-pattern portion contained in the circle was calculated.
(10) The foregoing operation (9) was performed with respect to all the selected sides, and a total of the resultants was calculated as a side-vicinity-streak area.
(11) The apex-vicinity-streak area and the side-vicinity-streak area obtained in this manner were used in the following expression:

$$\text{side-vicinity-streak-centralization ratio (\%)} = \text{side-vicinity area} / \text{apex-vicinity-streak area} \times 100$$

In accordance with the foregoing expression, the side-vicinity-streak-centralization ratio was calculated.
(12) In accordance with the binarized image that had been printed out, the side-vicinity-streak-centralization ratio of a second-largest particle was calculated, and the calculation was repeated with respect to smaller particles in order, so as to obtain data as to 10 particles in total.
(13) The obtained data as to the 10 particles were averaged, and the resultant was the average-side-vicinity-streak-centralization ratio.

(Ratio of Spaces in Artificial Marble)

The ratio of the spaces in the artificial marble was measured in accordance with the following method.
(1) First, a portion which did not have voids and spaces was cut out from the artificial marble, and specific gravity of the portion was measured. It was confirmed that the cut-out portion did not have voids and spaces by cutting the cut-out portion into small pieces after the measurement.
(2) Next, an arbitrary portion of the artificial marble was cut out, and specific gravity of the portion was measured.
(3) A ratio of the spaces was calculated by comparing the two values indicative of specific gravity obtained in the foregoing operations (1) and (2). In a case where, for example, the specific gravity of the portion having no void, that is, the specific gravity of the cut-out artificial marble was 1.82 and the arbitrary portion of the artificial marble was 1.80, (1.82−1.80)/1.82×100=1.1. Thus, it was presumed that there were spaces of approximately 1%. Note that, in a case where the ratio of the spaces calculated in the foregoing manner was not more than 1%, the ratio of the spaces in the artificial marble was judged to be 0%. Thus, it was presumed that there was no space when there was no significant difference between the two values indicative of the specific gravity obtained in the foregoing operations (1) and (2). Note that, the specific gravity in the foregoing operations (1) and (2) were measured with a pycnometer.

(Viscosity/Hardness of Reactive Product Material)

The viscosity of the reactive product material was measured with a Helipath viscometer (made by Brookfield Co., Ltd. England). Further, the hardness of the reactive product material was measured with a durometer hardness tester of type D (made by Toyo Seiki Industry Co., Ltd.).

(Color Difference)

The color difference between a color tone of the cured material of a crushed material and a color tone of the cured material of the molding compound (z) was measured as follows: The molding compound that had not been crushed was cured by using a plate-like metallic mold (30 cm by 30 cm, height (thickness) can be varied) so that a thickness of the molding compound was 1 cm. The molding compound (z) was placed on the foregoing molding compound that had been cut so that the thickness was 1 cm with it filling the metallic mold. At this time, a thickness of the molding compound (z) was 0.5 mm. The molding compound (z) was integrally cured in the metallic mold. The color difference between a color tone of the foregoing molding compound that had not been crushed and a color tone of the molding compound (z) was measured by using a color-difference meter in accordance with JIS K7105. As the color-difference meter, Color Measuring System (made by Nihon Densyoku Industry Co., Ltd.) was used.

Further, the color difference between a color tone of the cured material of the crushed material and a color tone of the cured material of the molding compound which formed the streak was calculated from an image obtained by digitizing a surface design of the obtained molding in accordance with the following manner.

In a case where two colors (a1, b1, L1) and (a2, b2, L2) were measured with a color-difference meter, the color difference ΔE is defined as follows.

$$\Delta E = \{(\Delta a)^2 + (\Delta b)^2 + (\Delta L)^2\}^{1/2}$$

(in this expression, Δa=a1−a2, Δb=b1−b2, ΔL=L1−L2)

While, in a case where images are digitized with a scanner or a digital camera so as to input the digitized images, it is possible to obtain color data with respect to each point of the input images. Generally, the color data is indicated by numerical values in (R, G, B), and (R, G, B) which indicate the coloring degree of red, green, and blue respectively. It is often that brightness and color tone deviate as a whole due to a digitizing condition etc. in the case where the images are input with a scanner or a digital camera. Thus, in the present invention, the color difference between a color tone of the cured material of the crushed material in the obtained molding and a color tone of the cured material of the molding compound (z) was evaluated in terms of relative color difference which can be easily evaluated in accordance with the images obtained by digitizing a surface design of the obtained molding.

In a case where (R, G, B) data is obtained with respect to a point of the input image, it is possible to convert the foregoing data into (a, b, L) value in accordance with the following expression.

$$a = 106.0 \times (R^{1/3} - G^{1/3})$$

$$b = 42.34 \times (G^{1/3} - B^{1/3})$$

$$L = 25.29 \times G^{1/3} - 18.38$$

However, since a value of (R, G, B) obtained from the input image ranges from 0 to the maximum value (for example, 255) defined on an image soft, it is preferable to modify the value by using a white standard plate etc. For example, in a case where the value (a, b, L) of a pure-white standard plate is (0, 0, 97), the value (R, G, B) is (97, 97, 97). If color data of a pure white portion (P, G, B) is (180, 200, 190) when the standard plate is taken in as an image with a digital camera, modification is performed by multiplying the respective values by 97/180, 97/200, and 97/190 so that each value is 97. In a case where a photographing condition is different, it is preferable that the standard plate is photographed again so as to calculate the value again.

EXAMPLE 1

70 parts methyl methacrylate and 30 parts styrene-2-hydroxyethyl methacrylate copolymer (LMSH200 (trade name) made by Sekisui Chemical Co., Ltd.) were mixed with each other, and the resultant was agitated for 2 hours with it heated at 40° C., so as to prepare a syrup. 4 parts hexamethylene diisocyanate trimer (Coronate HX (trade name) made by Nippon Polyurethane Industry, Co., Ltd.), 0.01 parts dibutyltin dilaurate, 0.5 parts 1,1-bis(t-butylperoxy)-3,3,5-trimethylcyclohexane(Perhexa 3M (trade name) made by Nippon Oil & Fats Co., Ltd.), 160 parts aluminium hydroxide (CW-325B (trade name) made by Sumitomo Chemical Co., Ltd.), and 1.0 parts white toner (AT-3 (trade name) made by Dainichiseika Colour & Chemicals Mfg. Co., Ltd.) were added to the 100 parts syrup, and mixed by agitation using a mixer. Thereafter, vacuum degassing was performed with respect to the resultant so as to prepare a mixture. The mixture was injected into a box-like container, and was left the whole day and night so as to react the mixture, so that a white, soft, reactive product material (a) in swelling gel phase jelly phase) was obtained.

The obtained reactive product material (a) was cut into brick-like blocks with a knife, and the blocks were cut into particles whose average particle diameter was 4 mm by using a rotary blade type high speed cutter (high speed crusher HS-35 (trade name) made by Nishimura Machinery Industry Co., Ltd.) so as to obtain white crushed material (1).

Further, black, soft reactive product material (b) in swelling gel phase was obtained by using 0.8 parts black toner (AT-256 (trade name) made by Dainichiseika Colour & Chemicals Mfg. Co., Ltd.). Other than the use of the black toner, the preparation was performed as in the reactive product material (a). A black crushed material (2) was obtained by cutting the obtained reactive product material (b) as in the reactive product material (a).

Further, brown, soft reactive product material (c) in swelling gel phase was obtained by using 1 part brown toner (AT-96 (trade name) made by Dainichiseika Colour & Chemicals Mfg. Co., Ltd.). Other than the use of the brown toner, the preparation was performed as in the reactive product material (a). A brown crushed material (3) was obtained by cutting the obtained reactive product material (c) as in the reactive product material (a).

The viscosity of the reactive product materials (a), (b), and (c) measured with a Helipath viscometer was 135,000 Pa·s, 125,000 Pa·s, and 140,000 Pa·s in order. Further, the hardness of the reactive product materials (a), (b), and (c) measured with a durometer hardness tester of type D was HDD 20, HDD 15, and HDD 35 in order.

Next, 50 parts the crushed material (1), 5 parts the crushed material (2), and 45 parts the crushed material (3) were put in an open drum, and also 0.3 parts titanium oxide (R-820 (trade name) made by ISHIHARA SANGYO KAISHA, CO., LTD.) was put in the open drum, and its lid was put on so as to rotate it with a drum rotating machine. In this manner, the crushed materials of the respective colors were agitated for 30 minutes, and the titanium oxide was uniformly made to adhere to a surface of the mixture as the molding compound (z) according to the present invention. As a result of the measurement performed in accordance with JIS K7105 by means of Color Measuring System (made by Nihon Densyoku Industry Co., Ltd.), the color difference between a color tone of the cured material of the crushed material (1), that is, a color tone of the cured material of the reactive product material (a) and a color tone of the cured material of the titanium oxide cured by providing it on the reactive product material (a) was 8.0. The color difference between a color tone of the cured material of the crushed material (2), that is, a color tone of the cured material of the reactive product material (b) and a color tone of the cured material of the titanium oxide cured by providing it on the reactive product material (b) was 25. The color difference between a color tone of the cured material of the crushed material (3), that is, a color tone of the cured material of the reactive product material (c) and a color tone of the cured material of the titanium oxide cured by providing it on the reactive product material (c) was 12.

Further, a weight change ratio in a case where the crushed material obtained in the foregoing manner was swelled with monomer which polymerizes by a radical polymerization reaction was measured. A 10 g crushed material was weighed, and the crushed material was put in a glass bottle which contained 100 g methyl methacrylate, and the glass bottle was closely stoppered. Then, the glass bottle was left in a constant-temperature box, whose temperature was adjusted to 23° C.±2° C., for 24 hours. Thereafter, the resultant was filtrated with a 50 mesh wire gauze, and the resultant was spread on a filter paper so as to absorb the methyl methacrylate which had adhered to a surface of the crushed material for the most part. Then, the resultant was moved to a glass Petri dish and its weight was measured. As a result, its weight was 14.5 g, and the weight change ratio was +45%.

Next, mixture of the crushed material was uniformly spread in a plate-like metallic mold whose temperature was adjusted to 120° C., and the mixture was subjected to thermal compression for 10 minutes by a pressure of 70 kg/cm$^2$ so as to cure the mixture, so that a plate having a uniformed thickness (13 mm thickness) was obtained.

After a surface of the plate was shaved by approximately 1 mm by sanding (grinding), the shaved surface was buffed. As a result, an artificial marble having the vivid white streak on a particle-like background in a mixture of white, black, and brown, which resembles a design of a natural stone, was obtained. The white streak had an acute angle along a particle surface, and there occurred no blurred portion which had been likely to occur at an end of a conventional resin product, so that a molding (artificial marble) having a novel design was obtained.

Figure 3:
FIG. 3 is a drawing showing a surface pattern of an artificial marble obtained in Example 1.

In the obtained molding, the ratio at which the particle portion occupies the surface area was 75%. The ratio at which the streaked-pattern portion occupies the surface area was 25%. Further, as to the molding, the average adjacent ratio was 60%. The average aspect ratio was 2.5. The large particle occupation ratio was 70%. the ratio at which spaces occupy the artificial marble was 0%. As a result of calculation in accordance with the image of the artificial marble, the color difference between the color tone of the cured material of the crushed material (1) and the color tone of the cured material of the titanium oxide was 6.6. The color difference between the color tone of the cured material of the crushed material (2) and the color tone of the cured material of the titanium oxide was 21. The color difference between the color tone of the cured material of the crushed material (3) and the color tone of the cured material of the titanium oxide was 8.5. FIG. 3 shows a surface pattern of the artificial marble obtained in the present Example on a display.

COMPARATIVE EXAMPLE 1

15 parts unsaturated polyester resin (Epolac N-36 (trade name) made by Nippon Shokubai Co., Ltd.), 35 parts calcium carbonate (NS-100 (trade name) made by Nitto Powder Chemical Industry Co., Ltd.), 50 parts white calcite (#70 (trade name) made by Nitto Powder Chemical Industry Co., Ltd), and 1 part benzoyl peroxide are kneaded. Then, the resultant is wadded up (without being hardened) into a ball shape of approximately 10 mm. 0.5 parts titanium oxide powder (R-820 (trade name) made by Ishihara Sangyo Kaisha, Ltd.) was sprinkled over the resultant, so as to obtain a molding compound (I) for comparison.

A metallic mold was filled as follows: a temperature of a metallic mold was set 100° C. Other than this, the metallic mold was filled with the molding compound (I) as in Example 1. As a result, a molding having white streaks on a translucent background was obtained. The streaks were dispersively mixed partially due to the flow brought about in molding, so that a surface pattern having a clear acute angle was not obtained. As a result, the obtained molding had an appearance which was different from that of a natural stone.

Further, the molding compound obtained by wadding up the foregoing materials into a ball shape of approximately 10 mm was used, and styrene monomer was used as the monomer. Other than this, a weight change ratio was calculated as in Example 1. As a result, the molding compound was dissolved in styrene monomer, and only the powder was left. That is, all the added resin (15 parts unsaturated polyester resin) was dissolved, only 35 parts calcium carbonate and 50 parts white calcite were left as powder which had lost an original shape. That is, the weight change ratio of the foregoing molding compound was −15%.

A ratio of spaces in the obtained molding (artificial marble) was measured. As a result of the measurement, the ratio was 0%. Note that, the obtained molding did not have clear particle-like pattern. Thus, as to the foregoing molding, it was impossible to measure a ratio at which the particle portion or the streaked pattern portion occupied the surface area, an average adjacent ratio, an average aspect ratio, and a large particle occupation ratio.

COMPARATIVE EXAMPLE 2

Figure 4:
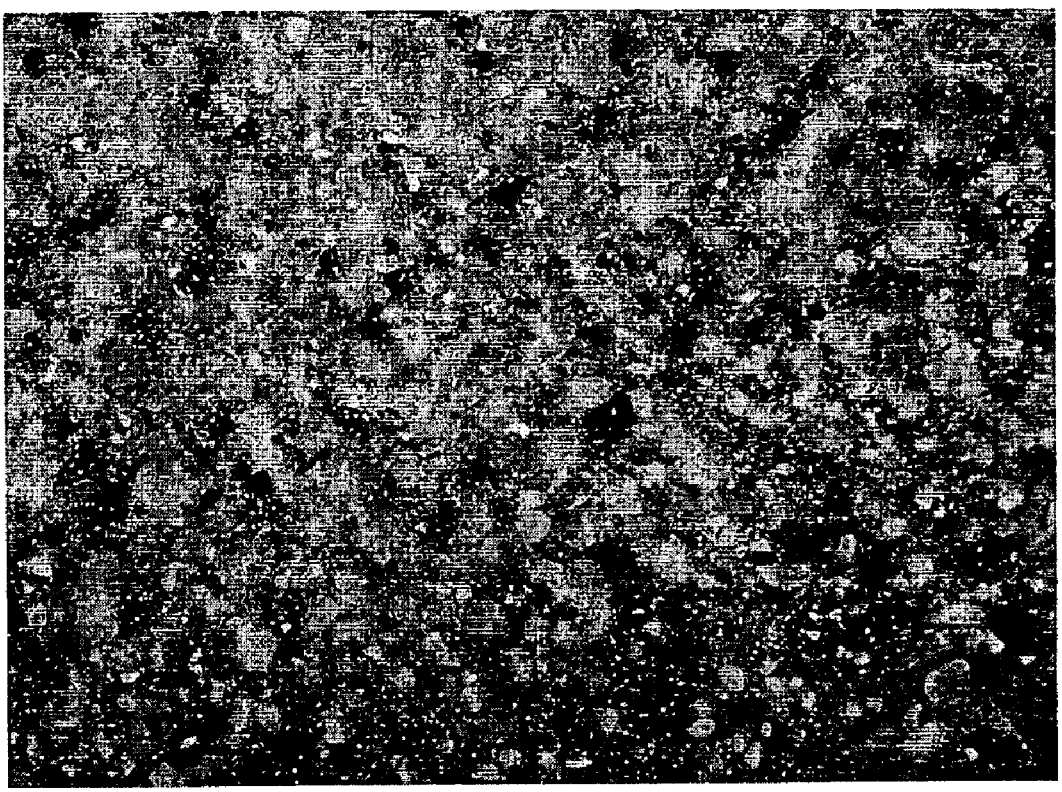
FIG. 4 is a drawing showing a surface pattern of a commercial artificial marble described in Compotation Example 2.
Figure 5:
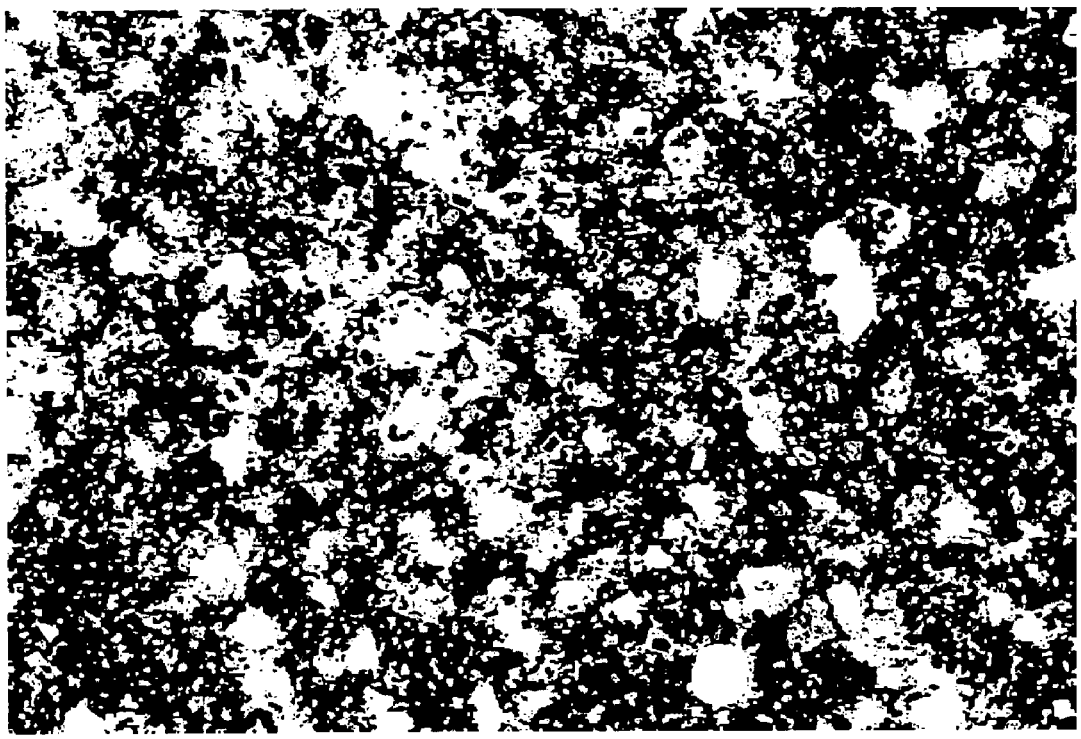
FIG. 5 is a drawing which shows a binarized image obtained by image processing performed with respect to the drawing shown in FIG. 4.

As to a commercial artificial marble (Marbe Ceres G-07 (trade name) made by N & L Marble Co., Ltd.), a ratio at which the particle portion and the matrix portion occupied the surface area, an average adjacent ratio, an average aspect ratio, a large particle occupation ratio, and a ratio of spaces in the artificial marble were measured. As a result, the ratio at which the particle portion occupied the surface area in the artificial marble was 45%. The ratio at which the matrix portion other than the particle portion occupied the surface area was 55%. Further, as to the foregoing molding, the average adjacent ratio was 10%. The average aspect ratio was 1.5. The large particle occupation ratio was 32%. The ratio of spaces in the artificial marble was 0%. FIG. 4 shows a surface pattern of the commercial artificial marble. FIG. 5 shows its binarized image.

EXAMPLE 2

The brown reactive product material (c) generated in Example 1 was crushed by using the rotary blade type high speed cutter. A hole diameter of the screen was changed so as to obtain the brown crushed material (4) whose average particle diameter was 2 mm, the brown crushed material (5) whose average particle diameter was 4 mm, and the brown crushed material (6) whose average particle diameter was 7 mm.

Note that, as to the reactive product material (c), a crush chip block, the viscosity measured with a Helipath viscometer was 140,000 Pa·s, and the hardness measured with a durometer hardness tester of type D was HDD 35.

Next, 20 parts crushed material (4), 30 parts crushed material (5), and 50 parts crushed material (6) were put in an open drum as in Example 1, and also 0.2 parts titanium oxide (R-820 (trade name) made by Ishihara Sangyo Kaisha, Ltd.) were put in the open drum, so that mixture, constituted of different-sized pieces of brown crushed material, to which titanium oxide had adhered as the molding compound (z) according to the present invention, was obtained as in Example 1. As a result of the measurement performed in accordance with JIS K7105 by means of Color Measuring System (made by Nihon Denshoku Co., Ltd.), the color difference between a color tone of the cured material of the crushed materials (4) to (6), that is, a color tone of the cured material of the reactive product material (c) and a color tone of the cured material of the titanium oxide cured by providing it on the reactive product material (c) was 11. The weight change ratio of the crushed material measured as in Example 1, that is, the weight change ratio of the reactive product material (c) was +45%.

The mixture of the crushed material to which titanium oxide had adhered was molded as in Example 1 so as to obtain a plate having a uniformed thickness. A surface of the plate was ground as in Example 1. As a result, an artificial marble, having the white streak on a brown particle-like background, which resembles a design of a natural stone, was obtained.

As to the obtained molding, a ratio of a particle portion area to a streaked-pattern portion area was 29 to 3. A ratio at which the particle portion occupied the surface area was 91%. A ratio at which the streaked-pattern portion occupied the surface area was 9%. Note that, the molding was closely filled with particles, and any void and spaces were not found. As to the foregoing molding, an average adjacent ratio was 70%. An average aspect ratio was 1.8. A large particle occupation ratio was 60%. A ratio of spaces in the artificial marble was 0%. As a result of calculation in accordance with the image of the artificial marble, the color difference between a color tone of the cured material of the crushed materials (4) to (6) and a color tone of the cured material of titanium oxide was 8.2. As described above, FIG. 6 is a drawing which shows a half tone image which displays a surface pattern of the artificial marble obtained in the present embodiment on a display. FIG. 7 shows its binarized image.

EXAMPLE 3

Instead of the White toner used in Example 1, 0.5 parts dark red toner (AT TS999 (trade name) made by Dainichiseika Colour & Chemicals Mfg. Co., Ltd.) was used. Other than this, in the same manner as Example 1, a dark red, soft, reactive product material (d) in swelling gel phase (jelly phase) was obtained.

The obtained reactive product material (d) was cut as in Example 1, so as to obtain a dark red crushed material (7) whose average particle diameter was 4 mm. The viscosity measured with a Helipath viscometer was 140,000 Pa·s, and the hardness measured with a durometer hardness tester of type D was HDD 35.

Next, 100 parts syrup prepared as in Example 1, 4 parts hexamethylene diisocyanate trimer (Coronate HX (trade name) made by Nippon Polyurethane Industry, Co., Ltd.), 0.01 parts dibutyltin dilaurate, 0.5 parts 1,1-bis(t-butylperoxy)-3,3,5-trimethylcyclohexane(Perhexa 3M (trade name) made by Nippon Oil & Fats Co., Ltd.), 100 parts aluminium hydroxide (CW-325B (trade name) made by Sumitomo Chemical Co., Ltd.), and 3.0 parts white toner (AT-3 (trade name) made by Dainichiseika Colour & Chemicals Mfg. Co., Ltd.) were mixed with each other. Thereafter, the mixture was divided into two portions. 0.2 parts black toner (AT-256 (trade name) made by Dainichiseika Colour & Chemicals Mfg. Co., Ltd.) was added to the one portion. After the resultant was mixed by agitation, both the two portions were subjected to vacuum degassing so as to obtain white mixture (i) and gray mixture (ii). 5 parts white mixture (i) and 5 parts gray mixture (ii) were weighed, and they were lightly mixed to such an extent that they were not completely mixed. As a result, a white-mottled mixture (iii) was obtained as the molding compound (z) according to the present invention. As a result of the measurement performed in accordance with JIS K7105 by means of Color Measuring System (made by Nihon Densyoku Co., Ltd.), the color difference between a color tone of the cured material of the crushed material (7) and a color tone of the cured material of the white mixture (i) cured by providing it on the crushed material (7) was 89. The color difference between a color tone of the cured material of the crushed material (7) and a color tone of the cured material of the gray mixture (ii) cured by providing it on the crushed material (7) was 92. The weight change ratio of the crushed material (7) measured as in Example 1 was +45%.

Next, the white-mottled mixture (iii) and 100 parts crushed material (7) were put in an open drum, and the lid was closed. Then, the open drum was rotated with a drum rotating machine for two minutes so as to agitate them. Thereafter, the obtained mixture was put into a box-like container, and was left the whole day and night so as to thicken the mixture, so that a block-like molding compound (e) was obtained.

The obtained block-like molding compound (e) was cured by using a plate-like metallic mold as in Example 1, and its surface was shaved by approximately 1 mm by sanding (grinding). This brought about an artificial marble having streaks, constituted of dark red particles and white/gray mottles provided on an interface of particles, which were variously colored at some parts.

Figure 8:
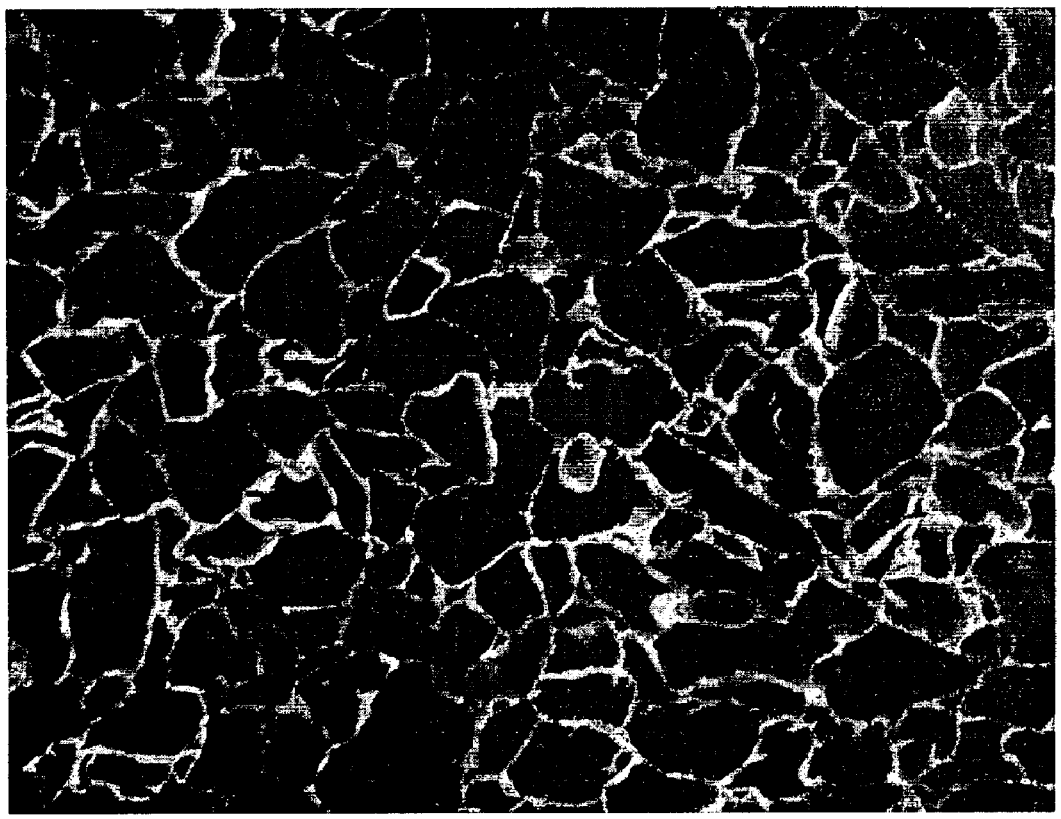
FIG. 8 is a drawing showing a surface pattern of an artificial marble obtained in Example 3.
Figure 9:
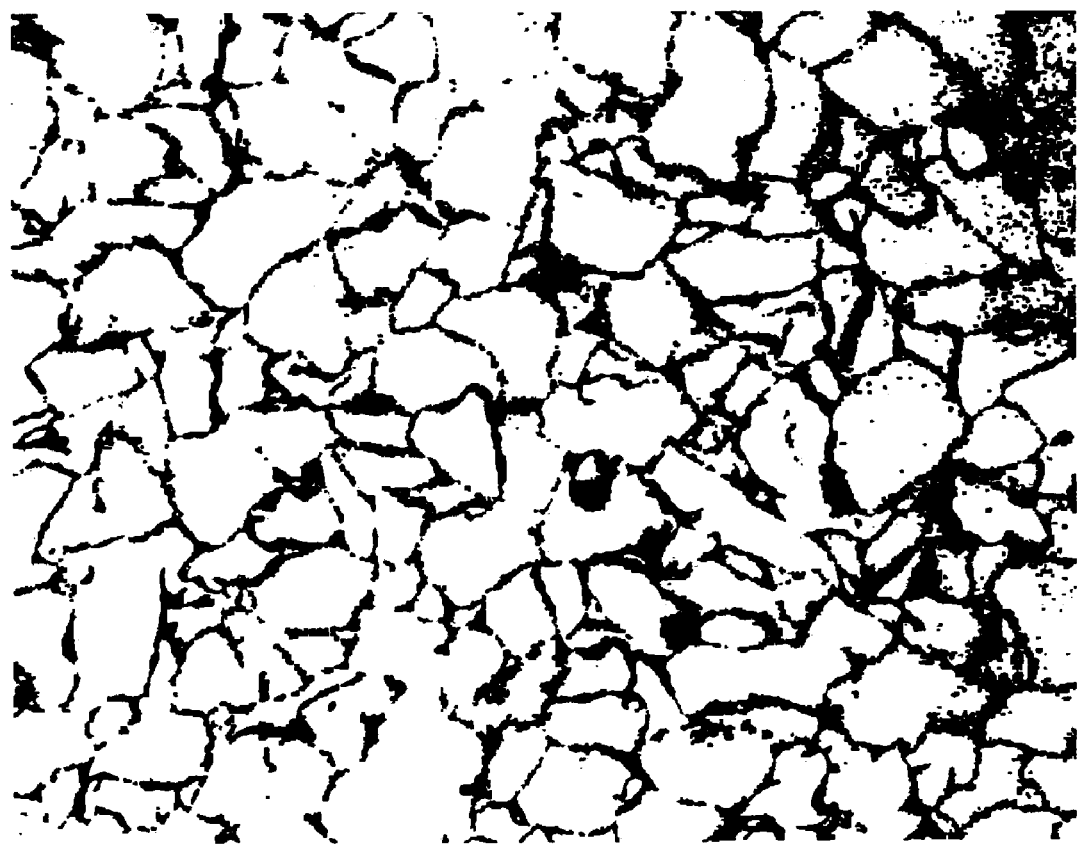
FIG. 9 is a drawing which shows a binarized image obtained by image-processing the drawing shown in FIG. 8.

As to the obtained molding, a ratio at which the particle portion occupied the surface area was 79%. A ratio at which the streaked-pattern portion occupied the surface area was 21%. Note that, the molding was closely filled with particles, and any void and spaces were not found. As to the foregoing molding, an average adjacent ratio was 90%. An average aspect ratio was 1.8. A large particle occupation ratio was 71%. A ratio of spaces in the artificial marble was 0%. As a result of calculation in accordance with the image of the artificial marble, the color difference between the color tone of the cured material of the crushed material (7) and the color tone of the cured material of the mixture (iii) was 84 at the white portion of the cured material, and 70 at the gray portion of the cured material. FIG. 8 shows a surface pattern of the artificial marble obtained in the present Example on a display. FIG. 9 shows its binarized image.

EXAMPLE 4

An amount of hexamethylene diisocyanate trimer was increased from 4 parts to 8 parts, and instead of the white toner used in Example 1, 0.5 parts dark red toner (AT TS999 (trade name) made by Dainichiseika Colour & Chemicals Mfg. Co., Ltd.) was used. Other than this, in the same manner as Example 1, a dark red, soft, reactive product material (f) in swelling gel phase (jelly phase) was obtained.

The obtained reactive product material (f) was cut by using the rotary blade high speed cutter after changing the hole diameter, so as to obtain a dark red crushed material (8) whose average particle diameter was 10 mm, a dark red crushed material (9) whose average particle diameter was 4 mm, and a dark red crushed material (10) whose average particle diameter was 2 mm. As to the reactive product material (f), a crush chip block, the viscosity measured with a Helipath viscometer was not less than 160,000 Pa·s (measuring limit), and the hardness measured with a durometer hardness tester of type D was HDD 50.

While, 75 parts methyl methacrylate and 25 parts polymethyl methacrylate (Sumipex EX (trade name) made by Sumitomo Chemical Co., Ltd.) were mixed with each other, and the resultant was agitated for 6 hours at 40° C., so as to prepare acrylic syrup. 3 parts black toner (AT-256 (trade name) made by Dainichiseika Colour & Chemicals Mfg. Co., Ltd.) and 0.5 parts 1,1-bis(t-butylperoxy)-3,3,5-trimethylcyclohexane (Perhexa 3M (trade name) made by Nippon Oil & Fats Co., Ltd.) were added to and mixed with the acrylic syrup 100 so as to obtain black syrup (x). The viscosity of the black syrup (x) was 0.5 Pa·s.

Next, 50 parts crushed material (8), 30 parts crushed material (9), 20 parts crushed material (10), and 15 parts black syrup (x) were put into a small concrete mixer, and they were agitated and mixed with each other for 10 minutes, so that mixture, constituted of different-sized pieces of a dark red crushed material, to which the black syrup had adhered as the molding compound (z) according to the present invention, was obtained. As a result of the measurement performed in accordance with JIS K7105 by means of Color Measuring System (made by Nihon Densyoku Co., Ltd.), the color difference between a color tone of the cured material of the crushed materials (8) to (10), that is, a color tone of the cured material of the reactive product material (f) and a color tone of the cured material of the black syrup (x) cured by providing it on the reactive product material (f) was 75. The weight change ratio of the crushed material measured as in Example 1, that is, the weight change ratio of the reactive product material (f) was +20%.

The mixture of the crushed materials to which the black syrup (x) had adhered was cured by using a plate-like metallic mold as in Example 1, and its surface was shaved by approximately 1 mm by sanding (rubbing). This brought about an artificial marble having a graceful design, constituted of dark red particles and black streaks formed on an interface of particles, which resembles a natural stone, as a molding. In this artificial marble, an area of streakes at a portion where apices of the particles were centralized was larger than an area of streaks at the side portions, so that a characteristic design having a large amount of matrix in a gap between particle corners was formed.

Figure 10:
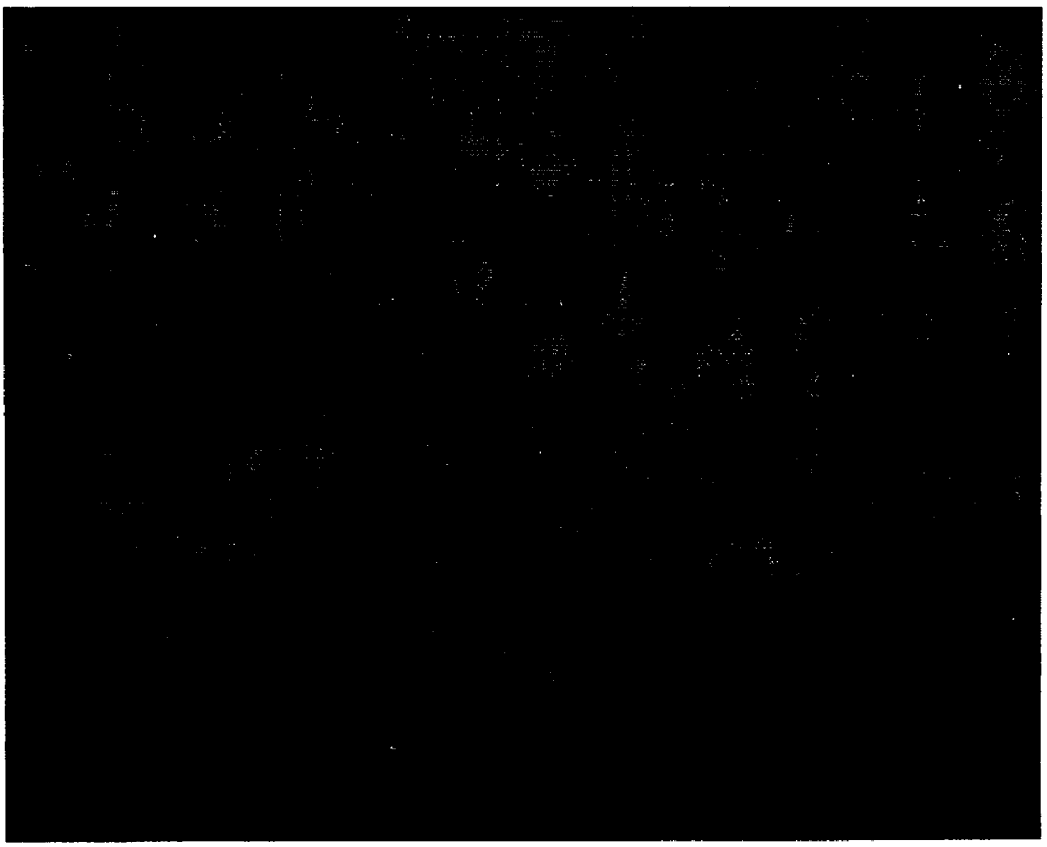
FIG. 10 is a drawing showing a surface pattern of an artificial marble obtained in Example 4.

As to the obtained molding, a ratio at which the particle portion occupied the surface area was 78%. A ratio at which the streaked-pattern portion occupied the surface area was 22%. Note that, the molding was closely filled with particles, and any void and spaces were not found. As to the foregoing molding, an average adjacent ratio was 60%. An average aspect ratio was 2.2. A large particle occupation ratio was 60%. A ratio of spaces in the artificial marble was 0%. As a result of calculation in accordance with the image of the artificial marble, the color difference between a color tone of the cured material of the crushed materials (8) to (10) and a color tone of the cured material of the black syrup (x) was 66. As to the foregoing molding, a side-vicinity-streak-centralization ratio was 35%. FIG. 10 shows a surface pattern of the artificial marble obtained in the present Example on a display.

EXAMPLE 5

100 parts syrup prepared as in Example 1, 4 parts hexamethylene diisocyanate trimer (Coronate HX (trade name) made by Nippon Polyurethane Industry, Co., Ltd.), 0.01 parts dibutyltin dilaurate, 0.5 parts 1,1-bis(t-butylperoxy)-3,3,5-trimethylcyclohexane(Perhexa 3M (trade name) made by Nippon Oil & Fats Co., Ltd.), 180 parts aluminium hydroxide (CW-325B (trade name) made by Sumitomo Chemical Co., Ltd.), and 0.05 parts beige toner (Baige NSB64 (trade name) made by Dainichiseika Colour & Chemicals Mfg. Co., Ltd.) were mixed with each other. Thereafter, 10 parts dark red crushed material (9), produced in Example 4, whose average particle diameter was 4 mm was added to them. After they were mixed by agitation, vacuum degassing was performed with respect to them so as to obtain a mixture. This mixture was put into a box-like container, and was left the whole day and night so as to react the mixture. This brought about a beige, soft reactive product material (g) in swelling gel phase (jelly phase) having brown (dark red) particles therein.

The obtained reactive product material (g) was crushed by using the rotary blade type high speed cutter. A hole diameter of the screen was changed so as to obtain a beige particle (11) containing a brown particle whose average particle diameter was 7 mm, a beige particle (12) containing a brown particle whose average particle diameter was 4 mm, and a beige particle (13) containing a brown particle whose average particle diameter was 2 mm.

Note that, as to the reactive product material (g), a crush chip block, the viscosity measured with a Helipath viscometer was 140,000 Pa·s, and the hardness was HDD 40.

Next, 40 parts beige particle (11) containing a brown particle whose average particle diameter was 7 mm, 20 parts beige particle (12) containing a brown particle whose average particle diameter was 4 mm, 40 parts beige particle (13) containing a brown particle whose average particle diameter was 2 mm, and 0.2 parts titanium oxide (R-820 (trade name) made by Ishihara Sangyo Kaisha, Ltd.) were put in an open drum, so that a mixture, constituted of different-sized beige particles containing brown particles, to which titanium oxide had adhered as the molding compound (z) according to the present invention, was obtained as in Example 1. As a result of the measurement performed in accordance with JIS K7105 by means of Color Measuring System (made by Nihon Densyoku Industry Co., Ltd.), the color difference between a color tone of the cured material of the brown particles and a color tone of the cured material of the titanium oxide cured by providing it on the brown particles was 45. The color difference between a color tone of the cured material of the beige particles and a color tone of the cured material of the titanium oxide cured by providing it on the beige particles was 21. The weight change ratio of the beige particle containing a brown particle measured as in Example 1, that is, the weight change ratio of the reactive product material (g) was +40%.

The mixture of the different-sized beige particles containing brown particles to which titanium oxide had adhered was cured by using a plate-like metallic mold as in Example 1, and its surface was shaved by approximately 1 mm by sanding (rubbing). This brought about an artificial marble having a graceful design, which was characterized in that the brown particles dispersively exist in the beige particles with the white streak therearound; particles exist in a particle, as a molding.

Figure 11:
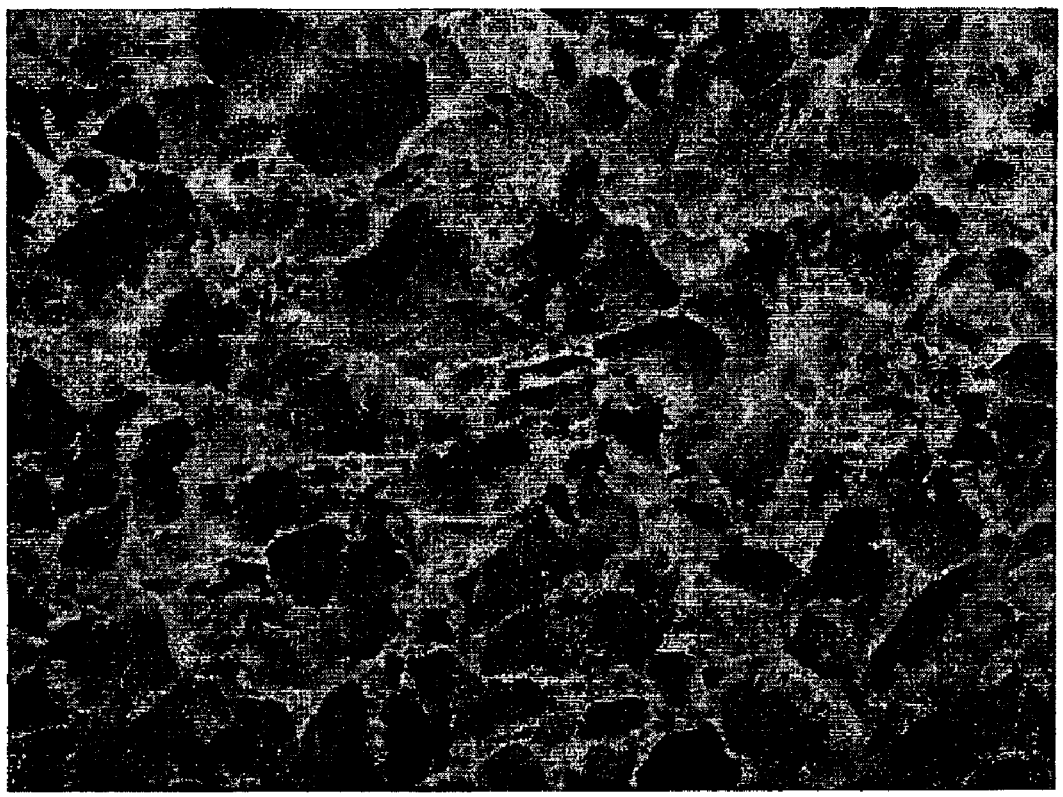
FIG. 11 is a drawing showing a surface pattern of an artificial marble obtained in Example 5.

As to the obtained molding, a ratio at which the particle portion occupied the surface area was 72%. A ratio at which the streaked-pattern portion occupied the surface area was 28%. Note that, the molding was closely filled with particles, and any void and spaces were not found. As to the foregoing molding, an average adjacent ratio was 55%. An average aspect ratio was 2.5. A large particle occupation ratio was 50%. A ratio of spaces in the artificial marble was 0%. As a result of calculation in accordance with the image of the artificial marble, the color difference between a color tone of the cured material of the beige particles containing brown particles (11) to (13) and a color tone of the cured material of titanium oxide was 43 at the brown portion, and 20 at the beige portion. FIG. 11 shows a surface pattern of the artificial marble obtained in the present Example on a display.

EXAMPLE 6

Instead of the white toner used in Example 1, 0.2 parts black toner (AT-256 (trade name) made by Dainichiseika Colour & Chemicals Mfg. Co., Ltd.), 0.8 parts beige toner (NSB64 (trade name) made by Dainichiseika Colour & Chemicals Mfg. Co., Ltd.), and 1 part dark red toner (AT TS999 (trade name) made by Dainichiseika Colour & Chemicals Mfg. Co., Ltd.) were used. Other than this, in the same manner as in Example 1, a black soft reactive product material (h) in swelling gel phase (jelly phase), a brown soft reactive product material (i), and a red (dark red) soft reactive product material (j) were obtained.

The obtained reactive product materials (h) to (j) were crushed by using the rotary blade type high speed cutter. A hole diameter of the screen was changed so as to obtain: a black crushed material (14) whose average particle diameter was 7 mm; a black crushed material (15) whose average particle diameter was 4 mm; a black crushed material (16) whose average particle diameter was 2 mm; a brown crushed material (17) whose average particle diameter was 7 mm; a brown crushed material (18) whose average particle diameter was 4 mm; a brown crushed material (19) whose average particle diameter was 2 mm; a red crushed material (20) whose average particle diameter was 7 mm; a red crushed material (21) whose average particle diameter was 4 mm; and a red crushed material (22) whose average particle diameter was 2 mm. As to the reactive product materials (h) to (j), crush chip blocks, the viscosity measured with a Helipath viscometer was respectively 140,000 Pa·s, and the hardness was respectively HDD 35.

As to the respective crushed materials, 25 parts crushed material (14), 3 parts crushed material (15), 2 parts crushed material (16), 25 parts crushed material (17), 0 part crushed material (18), 5 parts crushed material (19), 35 parts crushed material (20), 5 parts crushed material (21), and 0 part crushed material (22) were mixed with each other. 0.1 part titanium oxide (R-820 (trade name) made by Ishihara Sangyo Kaisha, Ltd.) was added to them, and the resultant was mixed for 10 minutes with a small concrete mixer. This brought about a mixture of different-sized multicolor particles to which titanium oxide had adhered as the molding compound (z) according to the present invention. As a result of the measurement performed in accordance with JIS K7105 by means of Color Measuring System (made by Nihon Densyoku Co., Ltd.), the color difference between a color tone of the cured material of the black crushed material and a color tone of the cured material of the titanium oxide cured by providing it on the black crushed material was 54. The color difference between a color tone of the cured material of the brown crushed material and a color tone of the cured material of the titanium oxide cured by providing it on the brown crushed material was 82. The color difference between the color tone of the cured material of the red crushed material and the color tone of the cured material of the titanium oxide cured by providing it on the red crushed material was 125. The weight change ratio of the respective crushed materials measured as in Example 1, that is, the weight change ratio of the reactive product materials (h) to (j) was +45%.

The mixture of the different-sized multicolor particles to which titanium oxide had adhered was cured by using a plate-like metallic mold as in Example 1, and its surface was shaved by approximately 1 mm by sanding (rubbing). This brought about an artificial marble having a natural-stone-like, graceful design which is constituted of three-color particle portion (red, black, brown) and a white-streaked-pattern portion.

Figure 12:
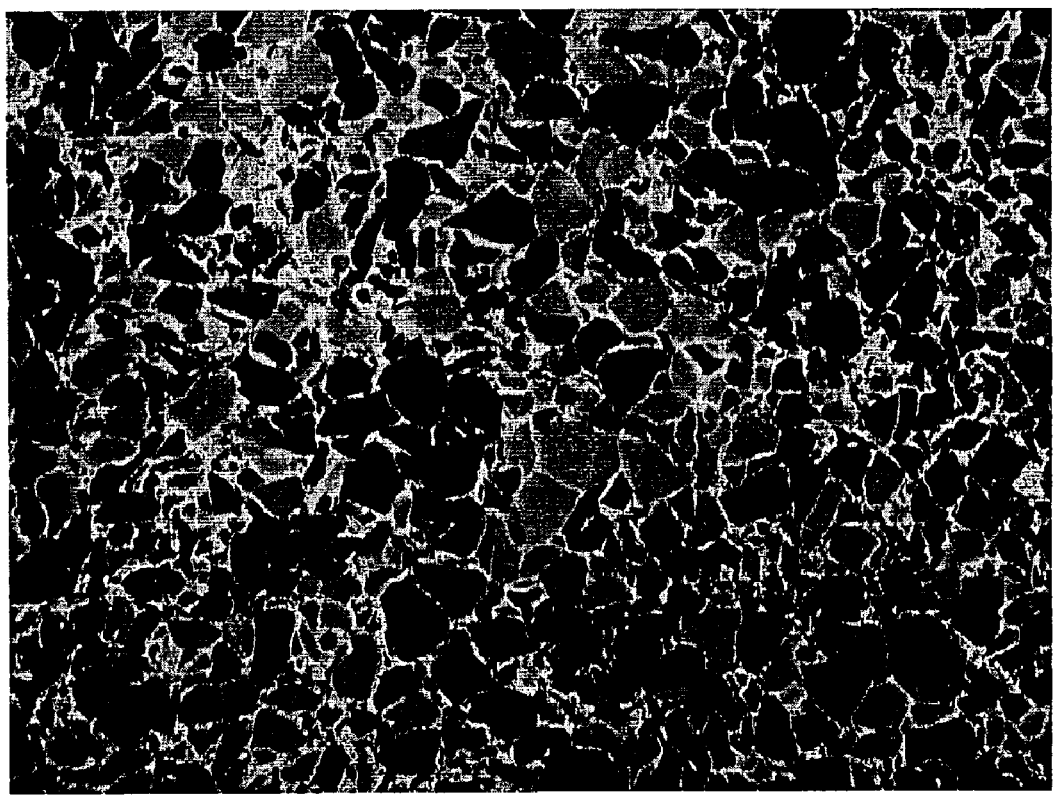
FIG. 12 is a drawing showing a surface pattern of an artificial marble obtained in Example 6.

As to the obtained molding, a ratio at which the particle portion occupied the surface area was 90%. A ratio at which the streaked-pattern portion occupied the surface area was 10%. Note that, the molding was closely filled with particles, and any void and spaces were not found. As to the foregoing molding, an average adjacent ratio was 65%. An average aspect ratio was 1.8. A large particle occupation ratio was 80%. A ratio of spaces in the artificial marble was 0%. As a result of calculation in accordance with the image of the artificial marble, the color difference between a color tone of the cured material of the black crushed particle (black particle) and a color tone of the cured material of titanium oxide was 52. The color difference between a color tone of the cured material of the brown crushed particles (brown particle) and a color tone of the cured material of titanium oxide was 72. The color difference between the color tone of the cured material of the red crushed particles (red particle) and a color tone of the cured material of titanium oxide, that has been calculated in accordance with the image of the artificial marble, was 121. FIG. 12 shows a surface patterns of the artificial marble obtained in the present Example on a display.

EXAMPLE 7

100 parts syrup prepared as in Example 1, 4 parts hexamethylene diisocyanate trimer (Coronate HX (trade name) made by Nippon Polyurethane Industry, Co., Ltd.), 0.01 parts dibutyltin dilaurate, 0.5 parts 1,1-bis(t-butylperoxy)-3,3,5-trimethylcyclohexane(Perhexa 3M (trade name) made by Nippon Oil & Fats Co., Ltd.), and 0.05 parts blue toner (Blue KR-5E382 (trade name) made by SUMIKA COLOR Co., Ltd.) were mixed with each other. Thus, a transparent, soft reactive product material (k) colored light blue was obtained as in Example 1.

The obtained reactive product material (k) was crushed by using the rotary blade type high speed cutter. A hole diameter of the screen was changed so as to obtain the light-blue crushed material (23) whose average particle diameter was 2 mm. As to the reactive product material (k), a crush chip block, the viscosity measured with a Helipath viscometer was 40,000 Pa·s, and the hardness measured with a durometer hardness tester of type D was HDD 15.

Next, 100 parts crushed material (1), used in Example 1, whose average diameter was 4 mm, 1 part crushed material (23), 0.1 part iron black (Black-1 (trade name) made by Dainichi kasei Industry Co., Ltd.) were put in an open drum as in Example 1, so that mixture, constituted of different-sized, two-color pieces of the crushed material, to which iron black had adhered as the molding compound (z) according to the present invention, was obtained as in Example 1. As a result of the measurement performed in accordance with JIS K7105 by means of Color Measuring System (made by Nihon Densyoku Co., Ltd.), the color difference between a color tone of the cured material of the crushed material (1), that is, a color tone of the cured material of the reactive product material (a) obtained in Example 1 and a color tone of the cured material of the iron black cured by providing it on the reactive product material (a) was 52. The color difference between a color tone of the cured material of the crushed material (23), that is, a color tone of the cured material of the reactive product material (k) and a color tone of the cured material of the iron black cured by providing it on the reactive product material (k) was 31. The weight change ratio of the crushed material (23) measured as in Example 1, that is, the weight change ratio of the reactive product material (k) was +45%.

The mixture of the different-sized pieces of the crushed materials to which iron black had adhered was cured as in Example 1 by using a plate-like metallic mold. A surface of the plate was shaved by approximately 1 mm by sanding (rubbing) the plate as in Example 1. As a result, an artificial marble having a natural-stone-like, graceful design in which black streak was formed on a white-particle background partially including light-blue particles, was obtained.

Figure 13:
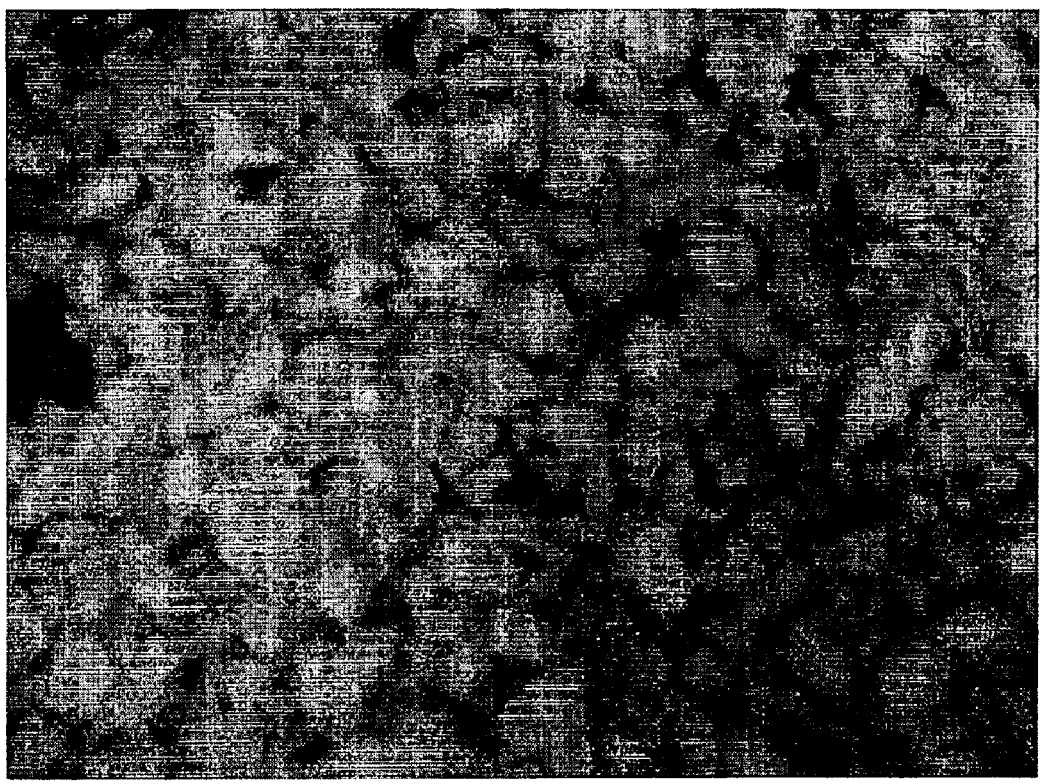
FIG. 13 is a drawing showing a surface pattern of an artificial marble obtained in Example 7.

As to the obtained molding, a ratio at which the particle portion occupied the surface area was 70%. A ratio at which the streaked-pattern portion occupied the surface area was 30%. Note that, the molding was closely filled with particles, and any void and spaces were not found. As to the foregoing molding, an average adjacent ratio was 50%. An average aspect ratio was 2.0. A large particle occupation ratio was 40%. A ratio of spaces in the artificial marble was 0%. As a result of calculation in accordance with the image of the artificial marble, the color difference between a color tone of the cured material (white particle) of the crushed material (1) and a color tone of the cured material of iron black was 16. The color difference between a color tone of the cured material (light-blue particle) of the crushed material (23) and a color tone of the cured material of iron black was also 16. FIG. 13 shows a surface pattern of the artificial marble obtained in the present Example on a display.

EXAMPLE 8

An amount of the white toner was decreased from 1.0 part to 0.1 parts. Other than this, in the same manner as Example 1, a white, soft, reactive product material (1) in swelling gel phase (jelly phase) was obtained.

The obtained reactive product material (1) was cut as in Example 1, so as to obtain a white crushed material (24) whose average particle diameter was 4 mm. As to the reactive product material (1), a crush chip block, the viscosity measured with Helipath viscometer was 140,000 Pa·s, and the hardness was HDD 35.

Next, 100 parts crushed material (24), 0.3 parts iron black (Black-1 (trade name) made by Dainichiseika Colour & Chemicals Mfg. Co., Ltd.) were put in an open drum as in Example 1, so that a crushed material, to which iron black had adhered as the molding compound (z) according to the present invention, was obtained as in Example 1. As a result of the measurement performed in accordance with JIS K7105 by means of Color Measuring System (made by Nihon Densyoku Co., Ltd.), the color difference between a color tone of the cured material of the crushed material (24), that is, a color tone of the cured material of the reactive product material (1) and a color tone of the cured material of the iron black cured by providing it on the reactive product material (1) was 59. The weight change ratio of the crushed material (24) measured as in Example 1, that is, the weight change ratio of the reactive product material (1) was +45%.

The crushed material (24) to which iron black had adhered was cured as in Example 1 by using a plate-like metallic mold. A surface of the plate was shaved by approximately 1 mm by sanding (rubbing) the plate as in Example 1. As a result, an artificial marble having a natural-stone-like, graceful design in which a black streak was formed on a background of white particles, was obtained.

Figure 14:
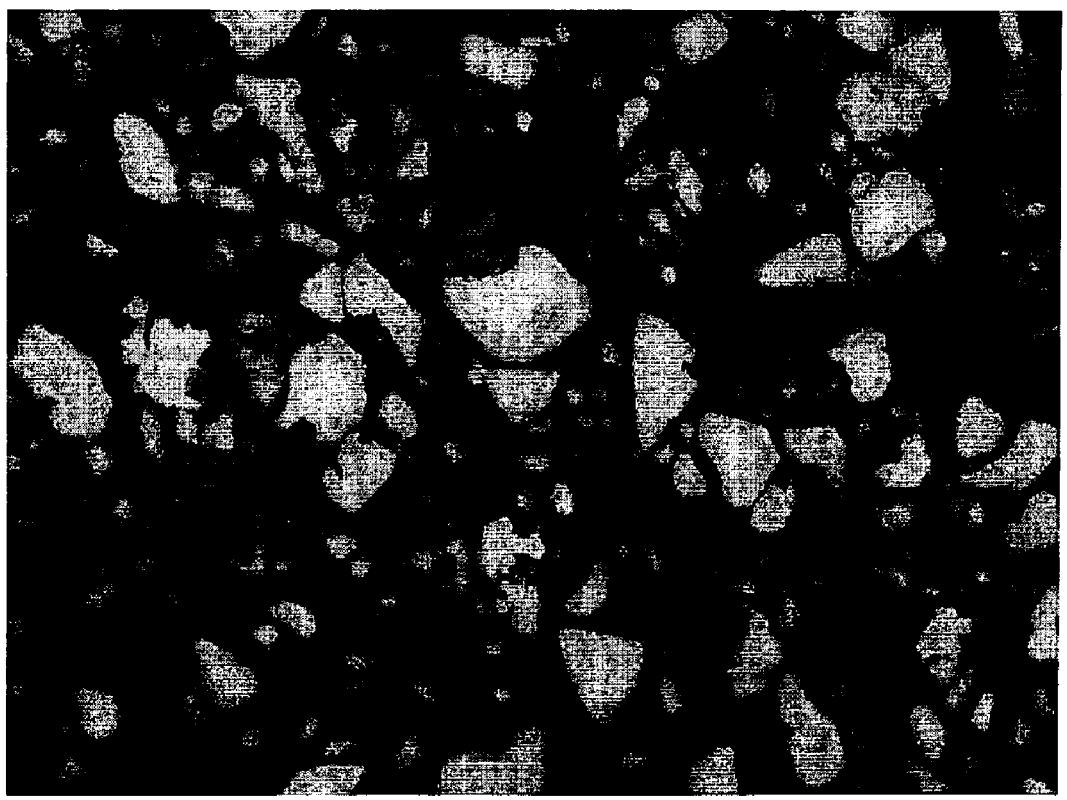
FIG. 14 is a drawing showing a surface pattern of an artificial marble obtained in Example 8.

Compared with artificial marbles obtained in other Examples, the foregoing artificial marble appeared to have more matrix portions. This is because the amount of the white toner in the particle portion was small and a part of the black streak could be seen through a background portion made up of white particles. A ratio at which the particle portion occupied the surface area was 70%. A ratio at which the streaked-pattern portion occupied the surface area was 30%. Note that, the molding was closely filled with particles, and any void and spaces were not found. An average adjacent ratio was 50%. An average aspect ratio was 2.0. A large particle occupation ratio was 40%. A ratio of spaces in the artificial marble was 0%. As a result of calculation in accordance with the image of the artificial marble, the color difference between a color tone of the cured material (white particle) of the crushed material (24) and a color tone of the cured material of iron black was 48. FIG. 14 shows a surface pattern of the artificial marble obtained in the present Example on a display.

EXAMPLE 9

Instead of the white toner, 0.1 part brown toner (AT-829 (trade name) made by Dainichiseika Colour & Chemicals Mfg. Co., Ltd.) and 0.05 parts yellow toner (AT-1195 (trade name) made by Dainichiseika Colour & Chemicals Mfg. Co., Ltd.) were added. Other than this, the agitation, the mixture, and the vacuum defoaming were performed in the same manner as in Example 1, so that a beige mixture (iv) was obtained.

Further, 0.5 parts red toner (ATTS999 (trade name) made by Dainichiseika Colour & Chemicals Mfg. Co., Ltd.) and 0.5 parts brown toner (AT-829 (trade name) made by Dainichiseika Colour & Chemicals Mfg. Co., Ltd.) were used. Other than this, in the same manner, a red brown mixture (v) was obtained.

Next, the beige mixture (iv) was poured into the same box-shaped container as that used in Example 1 so that its thickness was 20 mm. The red brown mixture (v) was poured into the container so that its thickness was 2 mm, and the pouring was performed so slowly that both the mixtures were hardly mixed with each other. In this manner, a layered mixture (having two layers) in which the red brown mixture (v) of 2 mm thickness was provided on the beige mixture (iv) of 20 mm thickness was obtained. Next, in a similar manner, the beige mixture (iv) of 20 mm thickness was poured on the foregoing two layered mixture, and the beige mixture (v) of 2 mm thickness was poured on the red brown mixture (iv) of 20 mm thickness. This operation was further continued, so that a layered mixture in which four layered beige mixtures (iv) and four layered red brown mixtures (v) were alternately stacked was obtained. Lastly, the beige mixture (iv) of 150 mm thickness was slowly poured on the layered mixture. The resultant was left as it was for all day and night, so that a soft reactive product (m) in swelling gel phase in which the beige layers and the red brown layers were alternately stacked were obtained.

The obtained reactive product (m) was cut in the same manner as in Example 1, so that this brought about a crushed material (25) having such pattern that: the red brown mixture (v) of a flow line was partially mixed in the beige mixture (iv) used as a background, and the average particle diameter was 7 mm.

The viscosity of the reactive product (m) measured with the Helipath viscometer was 125,000 Pa·s. Further, the hardness of the reactive product (m) measured with the durometer hardness tester of type D was 17 HDD.

Next, the patterned crushed material (25) was put into the open drum in the same manner as in Example 1, and 0.3 parts titanium oxide (R-820 (trade name) made by Ishihara Sangyo Kaisha, Ltd.) was put in the open drum, so that this brought about a beige crushed material (26) having such pattern that: the titanium oxide adhered to the surface as the molding compound (z) according to the present invention as in Example 1. The color difference between (a) a color tone of the cured material produced by curing the reactive product (n) obtained by reacting the beige mixture (iv) for all day and night and (b) a color tone of a cured material obtained by applying the titanium oxide on a surface of the reactive product (n) was 7.4. Further, the color difference between (a) a color tone of a cured material produced by curing a reactive product (o) obtained by reacting the red brown mixture (v) for all day and night and (b) a color tone of the cured material obtained by applying the titanium oxide on a surface of the reactive product (o) was 76. The color difference was measured in accordance with JIS K7105 by means of Color Measuring System (made by Nihon Densyoku Co., Ltd.). The weight change ratio of the crushed material (25) measured as in Example 1, that is, the weight change ratio of the reactive product material (m) was +45%.

The crushed material (26) to which titanium oxide had adhered was cured as in Example 1, and its surface was shaved by approximately 1 mm by sanding (rubbing). This brought about an artificial marble having a natural-stone-like, graceful design such that: red brown patterns were partially mixed in beige particles and white streaked patterns surrounded the beige particles.

Figure 15:
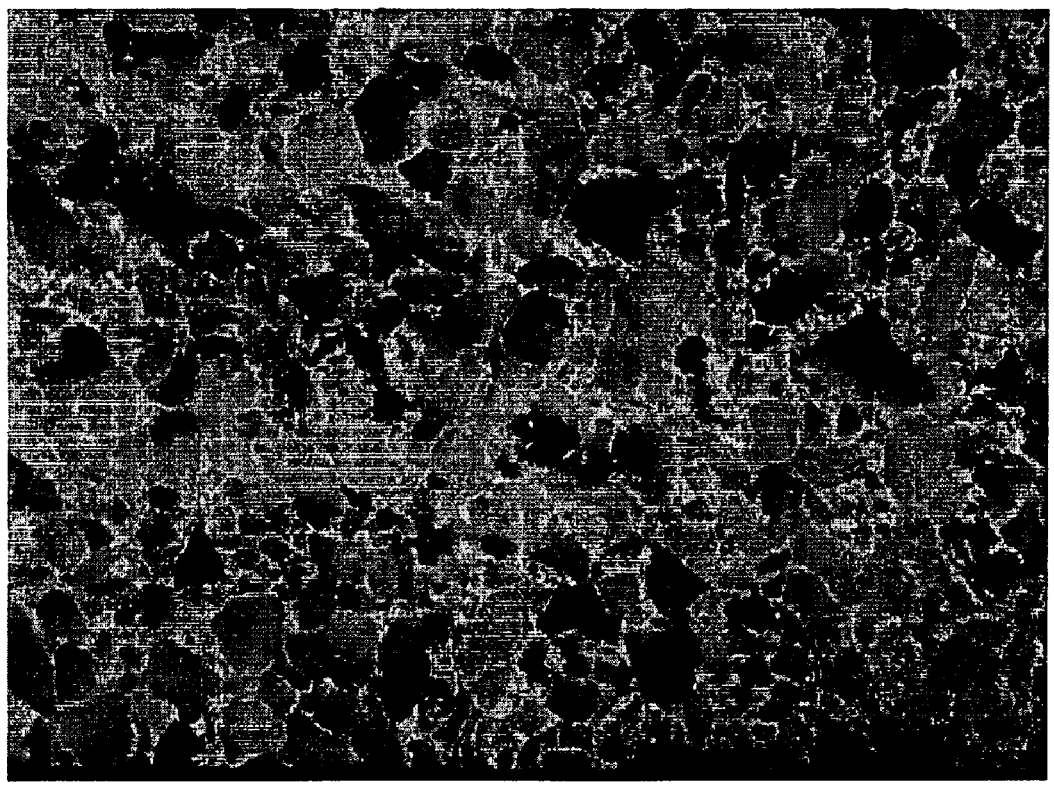
FIG. 15 is a drawing showing a surface pattern of an artificial marble obtained in Example 9.
Figure 16:
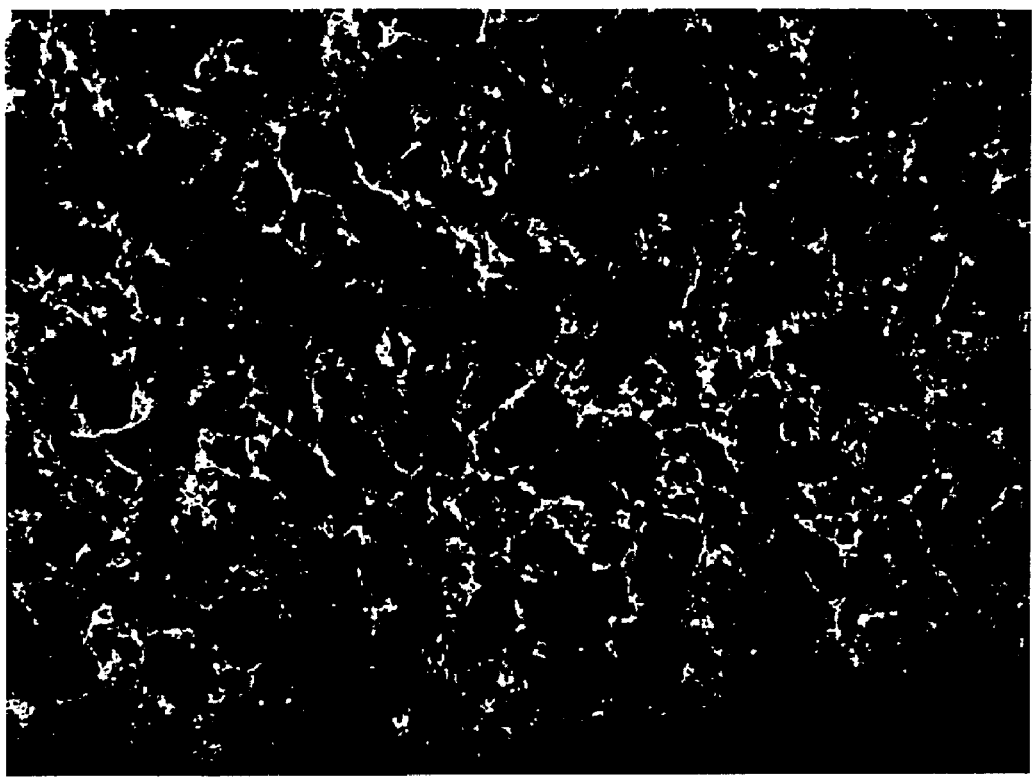
FIG. 16 is a drawing showing a binarized image obtained by performing an image process with respect to FIG. 15.

As to the obtained molding, a ratio at which the particle portion occupied the surface area was 91%. A ratio at which the streaked-pattern portion occupied the surface area was 9%. Note that, the molding was closely filled with particles, and any void and spaces were not found. As to the foregoing molding, an average adjacent ratio was 90%. An average aspect ratio was 2.1. A large particle occupation ratio was 85%. A ratio of spaces in the artificial marble was 0%. As a result of calculation in accordance with the image of the artificial marble, the color difference between a color tone of a beige portion of the cured material of the reactive product (m) and a color tone of the cured material (white) of the titanium oxide was 10. The color difference between a color tone of a red brown portion of the cured material of the reactive product (m) and a color tone of the cured material (white) of the titanium oxide was 78. FIG. 15 shows a surface pattern of the artificial marble obtained in the present Example. FIG. 16 shows a binarized image thereof.

EXAMPLE 10

Amounts of the toner were changed as shown in Table 1 unlike Example 1. Other than this, in the same manner as in Example 1, soft reactive product materials, colored black, brown, beige, gray, and white, that is in swelling gel phase, was obtained. The obtained reactive product material was cut as in Example 1, so as to obtain a 5-colored crushed material (particle) whose average particle diameter was 4 mm.

As to the reactive product material, the viscosities measured with Helipath viscometer were 125,000 Pa·s (black), 140,000 Pa·s (brown), 140,000 Pa·s (beige), 125,000 Pa·s (gray), and 135,000 Pa·s (white). The hardness measured with the durometer hardness tester of type D were HDD 15 (black), HDD 35 (brown), HDD 35 (beige), HDD 15 (gray), and HDD 20 (white).

Next, the colored crushed materials were mixed with each other by 20 parts respectively. Other than this, the molding was performed by using the same process as in Example 1. That is, the mixture constituted of the colored crushed materials was cured by using a plate-like metallic mold as in Example 1, and its surface was shaved by approximately 1 mm by sanding (grinding). This brought about an artificial marble having a natural-stone-like appearance such that: variously colored particles such as black, brown, beige, gray, and white particles were mixed with each other.

Figure 17:
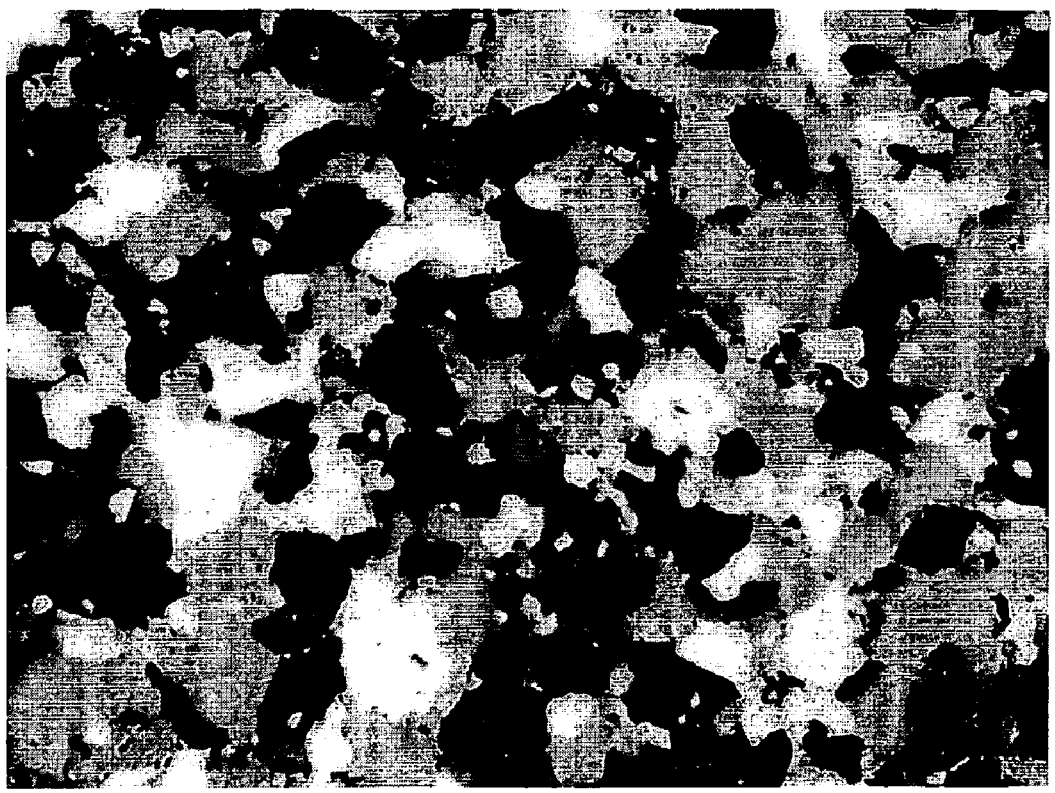
FIG. 17 is a drawing showing a surface pattern of an artificial marble obtained in Example 10.

As to the obtained molding, an average aspect ratio is 1.8, and a large particle occupation ratio is 97, and a ratio of spaces in the artificial marble was 0%. Note that, a ratio at which the particles occupied the surface area was 100%, and the molding was closely filled with particles, and any void and spaces were not found. Further, a weight change ratio of each crushed material measured in the same manner as in Example 1, that is, a weight change ratio of each reactive product material colored in the foregoing manner is +45%. FIG. 17 shows a surface pattern of the artificial marble obtained in the present Example.

TABLE 1

| Color of particle | Toner Trade name | Manufacturer | Use amount (parts) |
|---|---|---|---|
| Black | AT-256 | Dainichiseika Colour & Chemicals Mfg. Co., Ltd. | 0.37 |
| Brown | ATTS999 | Dainichiseika Colour & Chemicals Mfg. Co., Ltd. | 0.05 |
|  | AT-829 | Dainichiseika Colour & Chemicals Mfg. Co., Ltd. | 0.05 |
| Beige | AT-829 | Dainichiseika Colour & Chemicals Mfg. Co., Ltd. | 0.0035 |

TABLE 1-continued

| Color of particle | Toner Trade name | Manufacturer | Use amount (parts) |
|---|---|---|---|
|  | AT-1195 | Dainichiseika Colour & Chemicals Mfg. Co., Ltd. | 0.002 |
| Gray | AT-256 | Dainichiseika Colour & Chemicals Mfg. Co., Ltd. | 0.001 |
| White | AT-3 | Dainichiseika Colour & Chemicals Mfg. Co., Ltd. | 0.2 |
|  | TR-2451 | SUMIKA COLOR Co., Ltd | 0.001 |

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An artificial marble comprising: grainy resin cured materials (Y); and a matrix, wherein the grainy resin cured materials (Y) occupy a surface area of the artificial marble at 70 to 99%, and the matrix occupies the surface area of the artificial marble at 30 to 1%, and each of the grainy resin cured materials (Y) adjacent to each other has a joint surface so that the grainy resin cured materials (Y) are substantially interlocked with each other, and an average adjacent ratio of the grainy resin cured materials (Y) is not less than 50%, and an average aspect ratio of the grainy resin cured materials (Y) is not less than 1.1 and not more than 5.0, and a large particle occupation ratio is not less than 20%.

2. The artificial marble as set forth in claim 1, wherein the grainy resin cured materials (Y) adjacent to each other are different from each other in a color tone.

3. The artificial marble as set forth in claim 1, wherein the grainy resin cured materials (Y) contain metal hydroxide at 10 to 80% by weight thereof.

4. The artificial marble as set forth in claim 1, wherein each of the grainy resin cured materials (Y) has a predetermined pattern.

5. The artificial marble as set froth in claim 1, wherein a ratio of spaces in the artificial marble is not more than 1% with respect to a total volume of the artificial marble.

6. An artificial marble comprising an aggregate of grainy resin cured materials (Y) having linearly crushed surfaces, which is integrally molded, wherein each of the grainy resin cured materials (Y) adjacent to each other has a joint surface so that the grainy resin cured materials (Y) are substantially interlocked with each other, and a clear streak-like interface constituted of a cured material (Z) is formed between the grainy resin cured materials (Y) adjacent to each other, the cured material (Z) being different from the grainy resin cured materials (Y) in a color tone.

7. The artificial marble as set forth in claim 6, wherein color difference between a color tone of the grainy resin cured materials (Y) and a color tone of the cured material (Z) is not less than 3.

8. The artificial marble as set forth in claim 6, wherein an average adjacent ratio of the grainy resin cured materials (Y) is not less than 50%.

9. The artificial marble as set forth in claim 6, wherein an area surrounded by an apex of one of the grainy resin cured materials (Y) and other grainy resin cured materials (Y) adjacent to said one of the grainy resin cured materials (Y) is filled with the cured material (Z) which is different from the grainy resin cured materials (Y) in the color tone, and an average-side-vicinity-streak-centralization ratio is not more than 50%.

10. The artificial marble as set forth in claim 6, wherein the cured material (Z) has the color tone which varies partially.

11. The artificial marble as set forth in claim 6, wherein the grainy resin cured materials (Y) occupy a surface area of the artificial marble at 70 to 99% of the total surface area thereof.

12. The artificial marble as set forth in claim 6, wherein an average aspect ratio of the grainy resin cured materials (Y) is not less than 1.1 and not more than 5.0, and a large particle occupation ratio of the grainy resin cured materials (Y) is not less than 20%.

13. The artificial marble as set forth in claim 6, wherein the grainy resin cured materials (Y) adjacent to each other are different from each other in the color tone.

14. The artificial marble as set forth in claim 6, wherein the grainy resin cured materials (Y) contain metal hydroxide at 10 to 80% by weight thereof.

15. The artificial marble as set froth in claim 6, wherein each of the grainy resin cured materials (Y) has a predetermined pattern.

16. The artificial marble as set forth in claim 6, wherein a ratio of spaces in the artificial marble is not more than 1% with respect to a total volume of the artificial marble.

17. An artificial marble comprising an aggregate of grainy resin cured materials (Y) having linearly crushed surfaces, which is integrally molded, wherein each of the grainy resin cured materials (Y) adjacent to each other has a joint surface so that the grainy resin cured materials (Y) are substantially interlocked with each other, and an area surrounded by an apex of one of the grainy resin cured materials (Y) and other grainy resin cured materials (Y) adjacent to said one of the grainy resin cured materials (Y) is filled with the cured material (Z) which is different from the grainy resin cured materials (Y) in the color tone, said apex being constituted of a sharp crushed surface.

18. The artificial marble as set forth in claim 17, wherein the cured material (Z) has the color tone which varies partially.

19. The artificial marble as set forth in claim 17, wherein the grainy resin cured materials (Y) occupy a surface area of the artificial marble at 70 to 99% of the total surface area thereof.

20. The artificial marble as set forth in claim 17, wherein an average aspect ratio of the grainy resin cured materials (Y) is not less than 1.1 and not more than 5.0, and a large particle occupation ratio is not less than 20%.

21. The artificial marble as set forth in claim 17, wherein the grainy resin cured materials (Y) adjacent to each other are different from each other in the color tone.

22. The artificial marble as set forth in claim 17, wherein the grainy resin cured materials (Y) contain metal hydroxide at 10 to 80% by weight thereof.

23. The artificial marble as set forth in claim 17, wherein each of the grainy resin cured materials (Y) has a predetermined pattern.

24. The artificial marble as set forth in claim 17, wherein a ratio of spaces in the artificial marble is not more than 1% with respect to a total volume of the artificial marble.

25. An artificial marble comprising an aggregate of grainy resin cured materials (Y) having linearly crushed surfaces, which is integrally molded, wherein each of the grainy resin cured materials (Y) adjacent to each other has a joint surface so that the grainy resin cured materials (Y) are interlocked with each other, and the grainy resin cured materials (Y) are directly joined with each other, and a clear streak-like interface is formed between the grainy resin cured materials (Y) adjacent to each other, the grainy resin cured materials (Y) adjacent to each other being different from each other in a color tone.

26. The artificial marble as set forth in claim 25, wherein an average aspect ratio of the grainy resin cured materials (Y) is not less than 1.1 and not more than 5.0, and a large particle occupation ratio is not less than 20%.

27. The artificial marble as set forth in claim 25, wherein the grainy resin cured materials (Y) contain metal hydroxide at 10 to 80% by weight thereof.

28. The artificial marble as set forth in claim 25, wherein each of the grainy resin cured materials (Y) has a predetermined pattern.

29. The artificial marble as set forth in claim 25, wherein a ratio of spaces in the artificial marble is not more than 1% with respect to a total volume of the artificial marble.

30. A producing method of an artificial marble, comprising the steps of:

making a molding compound (z) adhere to a surface of a molding compound in swelling gel phase so that a ratio of the molding compound (z) to a total amount of the molding compound (z) and the molding compound in swelling gel phase is not less than 0.01 by weight and not more than 30 by weight, and molding a molding compound in swelling gel phase and the molding compound (z) under a thermal pressure, wherein:

the molding compound in swelling gel phase has been prepared by crushing a swelling gel, swelled with a monomer in liquid phase which polymerizes a compound having three-dimensional linking by a radical polymerization reaction, into a predetermined size, the molding compound in swelling gel phase substantially not dissolving in the monomer and having a weight change ratio which ranges from 0 to +200% in a case where the molding compound in swelling gel phase is completely impregnated with the monomer, and the molding compound (z) has been prepared so that color difference between a color tone of a cured material of the molding compound in swelling gel phase and a color tone of a cured material of the molding compound (z) is not less than 3 when the molding compound (z) is applied on the surface of the molding compound in swelling gel phase so as to be cured.

31. The producing method of the artificial marble as set forth in claim 30, wherein the molding compound (z) is powder.

32. The producing method of the artificial marble as set forth in claim 30, wherein the molding compound in swelling gel phase having the molding compound (z) on the surface of the molding compound in swelling gel phase is spread in a metallic mold so as to mold the molding compound in swelling gel phase and the molding compound (z) into the plate-like molding under the thermal pressure, and a surface of the plate-like molding is ground.

33. A producing method of an artificial marble, comprising the steps of:

making a molding compound (z) adhere to a surface of the molding compound in swelling gel phase so that a ratio of the molding compound (z) to a total amount of the molding compound (z) and the molding compound in swelling gel phase is not less than 0.01 by weight and not more than 30 by weight; and molding the molding compound (z) and the molding compound in swelling gel phase under a thermal pressure, wherein:

the molding compound in swelling gel phase has been prepared by crushing a swelling gel, generated by swelling a reactive compound with monomer in liquid phase which polymerizes by a radical polymerization reaction, into a predetermined size, viscosity of the swelling gel measured with a Helipath viscometer being not less than 1,000 Pa·s, the reactive compound having three-dimensional linking based on a reaction between starting materials (A) and (B), the starting material (A) having a plurality of reactive substituents selected from a hydroxyl group and a carboxyl group, the starting material (B) being a least one of (i) a polyfunctional polyiscyanate, (ii) an organic aluminium, and (iii) an alkali earth metal oxide, at least one of the starting materials (A) and (B) containing a material of three or more functions; and the molding compound (z) has been prepared so that color difference between a color tone of a cured material of the molding compound in swelling gel phase and a color tone of a cured material of the molding compound (z) is not less than 3 when the molding compound (z) is applied on the surface of the molding compound in swelling gel phase so as to be cured.

34. The producing method of the artificial marble as set forth in claim 33, wherein the molding compound (z) is powder.

35. The producing method of the artificial marble as set forth in claim 33, wherein the molding compound in swelling gel phase having the molding compound (z) on the surface of the molding compound in swelling gel phase is spread in a metallic mold so as to mold the molding compound in swelling gel phase and the molding compound (z) into a plate-like molding under the thermal pressure, and a surface of the plate-like molding is ground.

36. The artificial marble a set forth in claim 1, wherein a molding compound in swelling gel phase that has been prepared by crushing a swelling gel, swelled with a monomer in liquid phase which polymerizes a compound having three-dimensional linking by a radical polymerization reaction, into a predetermined size, is molded and joined under a thermal pressure, so as to cause each of the grainy resin cured materials (Y) adjacent to each other to have a linearly crushed surface and a joint surface so that the grainy resin cured materials (Y) are interlocked with each other.

37. The artificial marble a set forth in claim 6, wherein a molding compound in swelling gel phase that has been prepared by crushing a swelling gel, swelled with a monomer in liquid phase which polymerizes a compound having three-dimensional linking by a radical polymerization reaction, into a predetermined size, is molded and joined under a thermal pressure, so as to cause each of the grainy resin cured materials (Y) adjacent to each other to have a linearly crushed surface and a joint surface so that the grainy resin cured materials (Y) are interlocked with each other.

38. The artificial marble a set forth in claim 17, wherein a molding compound in swelling gel phase that has been prepared by crushing a swelling gel, swelled with a monomer in liquid phase which polymerizes a compound having three-dimensional linking by a radical polymerization reaction, into a predetermined size, is molded and joined under a thermal pressure, so as to cause each of the grainy resin cured materials (Y) adjacent to each other to have a linearly crushed surface and a joint surface so that the grainy resin cured materials (Y) are interlocked with each other.

39. The artificial marble a set forth in claim 25, wherein a molding compound in swelling gel phase that has been prepared by crushing a swelling gel, swelled with a monomer in liquid phase which polymerizes a compound having three-dimensional linking by a radical polymerization reaction, into a predetermined size, is molded and joined under a thermal pressure, so as to cause each of the grainy resin cured materials (Y) adjacent to each other to have a linearly crushed surface and a joint surface so that the grainy resin cured materials (Y) are interlocked with each other.

40. The method as set forth in claim 36, wherein the molding compound in swelling gel phase substantially does not dissolve in the monomer and has a weight change ratio which ranges from 0 to +200% in a case where the molding compound in swelling gel phase is completely impregnated with the monomer.

41. The method as set forth in claim 37, wherein the molding compound in swelling gel phase substantially does not dissolve in the monomer and has a weight change ratio which ranges from 0 to +200% in a case where the molding compound in swelling gel phase is completely impregnated with the monomer.

42. The method as set forth in claim 38, wherein the molding compound in swelling gel phase substantially does not dissolve in the monomer and has a weight change ratio which ranges from 0 to +200% in a case where the molding compound in swelling gel phase is completely impregnated with the monomer.

43. The method as set forth in claim 39, wherein the molding compound in swelling gel phase substantially does not dissolve in the monomer and has a weight change ratio which ranges from 0 to +200% in a case where the molding compound in swelling gel phase is completely impregnated with the monomer.

44. The method as set forth in claim 36, wherein the molding compound in swelling gel phase has been prepared by crushing a swelling gel, generated by swelling a reactive compound with monomer in liquid phase which polymerizes by a radical polymerization reaction, into a predetermined size, viscosity of the swelling gel measured with a Helipath viscometer being not less than 1,000 Pa·s, the reactive compound having three-dimensional linking based on a reaction between starting materials (A) and (B), the starting material (A) having a plurality of reactive substituents selected from a hydroxyl group and a carboxyl group, the starting material (B) being at least one of (i) a polyfunctional polyisocyanate, (ii) an organic alimium, and (iii) an alkali earth metal oxide, at least one of the starting materials (A) and (B) containing a material of three or more functions.

45. The method as set forth in claim 37, wherein the molding compound in swelling gel phase has been prepared by crushing a swelling gel, generated by swelling a reactive compound with monomer in liquid phase which polymerizes by a radical polymerization reaction, into a predetermined size, viscosity of the swelling gel measured with a Helipath viscometer being not less than 1,000 Pa·s, the reactive compound having three-dimensional linking based on a reaction between starting materials (A) and (B), the starting material (A) having a plurality of reactive substituents selected from a hydroxyl group and a carboxyl group, the starting material (B) being at least one of (i) a polyfunctional polyisocyanate, (ii) an organic alimium, and (iii) an alkali earth metal oxide, at least one of the starting materials (A) and (B) containing a material of three or more functions.

46. The method as set forth in claim 38, wherein the molding compound in swelling gel phase has been prepared by crushing a swelling gel, generated by swelling a reactive compound with monomer in liquid phase which polymerizes by a radical polymerization reaction, into a predetermined size, viscosity of the swelling gel measured with a Helipath viscometer being not less than 1,000 Pa·s, the reactive compound having three-dimensional linking based on a reaction between starting materials (A) and (B), the starting material (A) having a plurality of reactive substituents selected from a hydroxyl group and a carboxyl group, the starting material (B) being at least one of (i) a polyfunctional polyisocyanate, (ii) an organic alimium, and (iii) an alkali earth metal oxide, at least one of the starting materials (A) and (B) containing a material of three or more functions.

47. The method as set forth in claim 39, wherein the molding compound in swelling gel phase has been prepared by crushing a swelling gel, generated by swelling a reactive compound with monomer in liquid phase which polymerizes by a radical polymerization reaction, into a predetermined size, viscosity of the swelling gel measured with a Helipath viscometer being not less than 1,000 Pa·s, the reactive compound having three-dimensional linking based on a reaction between starting materials (A) and (B), the starting material (A) having a plurality of reactive substituents selected from a hydroxyl group and a carboxyl group, the starting material (B) being at least one of (i) a polyfunctional polyisocyanate, (ii) an organic alimium, and (iii) an alkali earth metal oxide, at least one of the starting materials (A) and (B) containing a material of three or more functions.

48. A product by process, obtained through the method as set forth in claim 30.

49. A product by process, obtained through the method as set forth in claim 33.

* * * * *